United States Patent [19]

Bergles et al.

[11] Patent Number: 5,362,278

[45] Date of Patent: Nov. 8, 1994

[54] CHAIN DRIVING MECHANISM FOR A BICYCLE OR THE LIKE

[75] Inventors: Eduard Bergles, Graz, Austria; Wolf Waschkuhn, Schweinfurt; Kai-Uwe Rüde, Grafenrheinfeld, both of Netherlands; Edouard Dumas, St. Etienne de St. Geoirs, France

[73] Assignee: Fichtel & Sachs AG, Schweinfurt, Germany

[21] Appl. No.: 32,138

[22] Filed: Mar. 17, 1993

[30] Foreign Application Priority Data

Mar. 18, 1992 [DE] Germany ............... 4208712
Mar. 18, 1992 [DE] Germany ............... 4208713

[51] Int. Cl.[5] .................................... F16H 55/30
[52] U.S. Cl. .............................. 474/69; 474/160
[58] Field of Search .................... 474/69-70, 474/78, 152, 160

[56] References Cited

U.S. PATENT DOCUMENTS

| | | |
|---|---|---|
| 2,722,843 | 11/1955 | Edwards . |
| 5,030,175 | 7/1991 | Schwengel .............. 474/214 |
| 5,123,878 | 6/1992 | Nagano ................... 474/160 |
| 5,188,569 | 2/1993 | Kobayashi ............... 474/160 |
| 5,246,402 | 9/1993 | Romano ................ 474/160 X |

FOREIGN PATENT DOCUMENTS 0047927 3/1982 European Pat. Off. .
2-221736 9/1990 Japan .

*Primary Examiner*—Michael Powell
*Attorney, Agent, or Firm*—Brumbaugh, Graves, Donohue & Raymond

[57] ABSTRACT

In a chain driving mechanism a chain runs around a wheel-side sprocket of a set of sprockets and around a pedal crank-side sprocket. The engaged sprocket is located between a sprocket of larger diameter and a sprocket of smaller diameter. The chain is in axial direction adjacent said neighbouring sprocket of larger diameter and projects in opposite direction beyond the neighbouring sprocket of smaller diameter.

58 Claims, 11 Drawing Sheets

Fig. 2
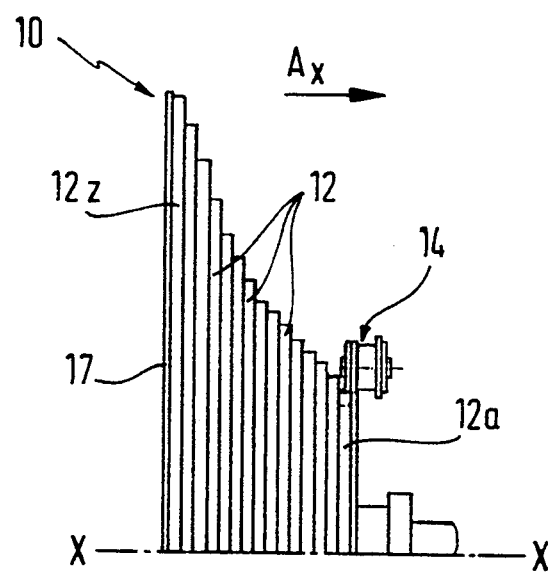
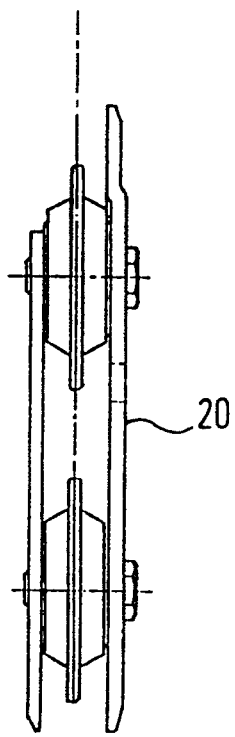

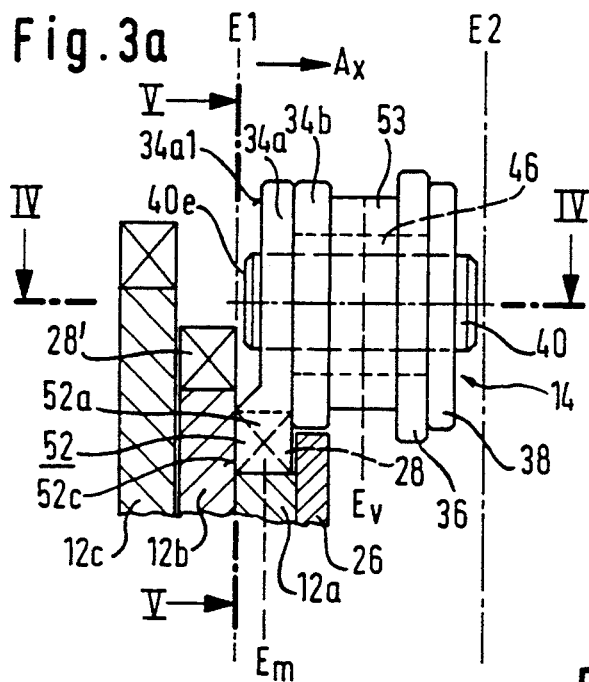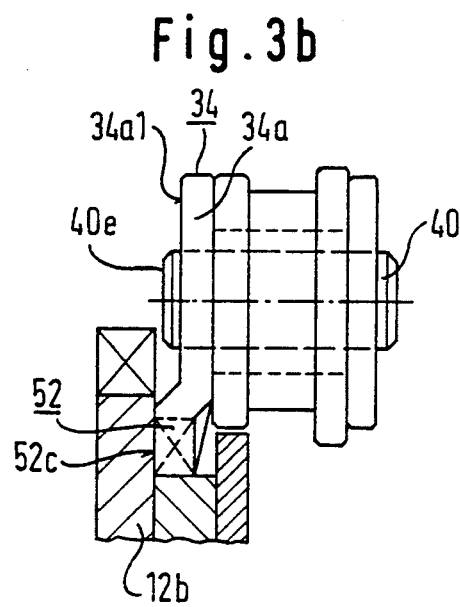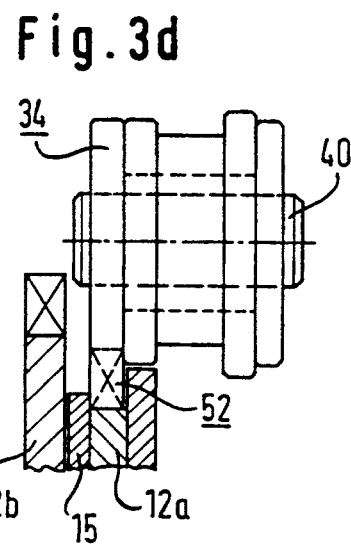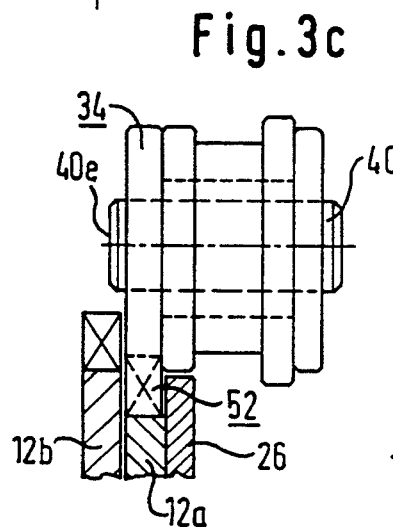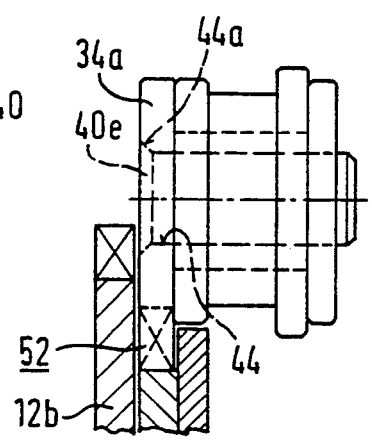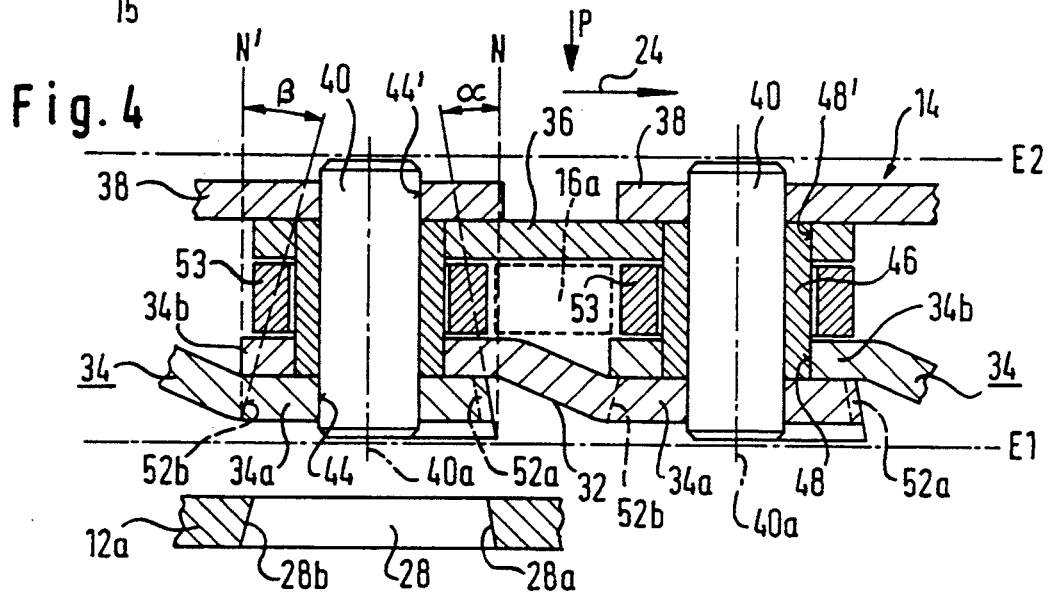

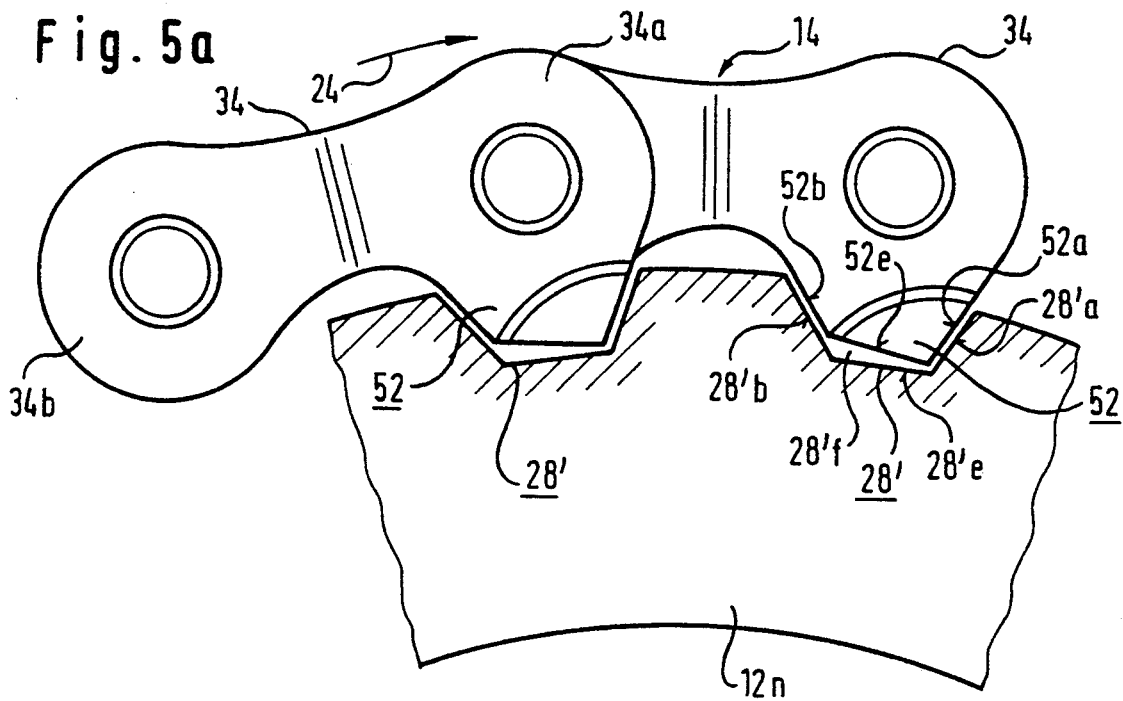
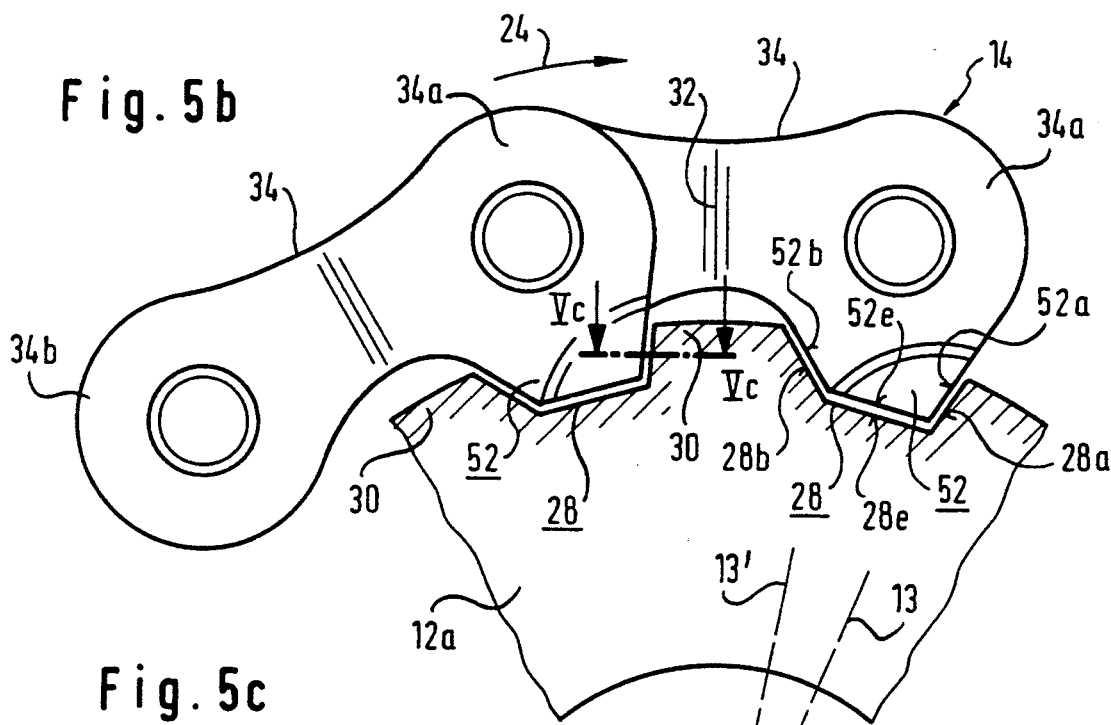
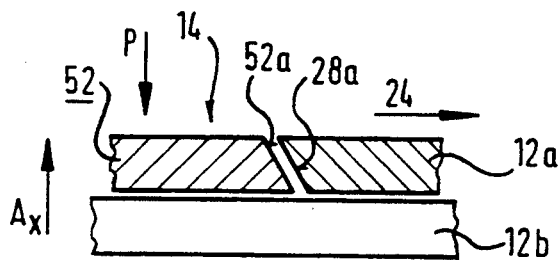

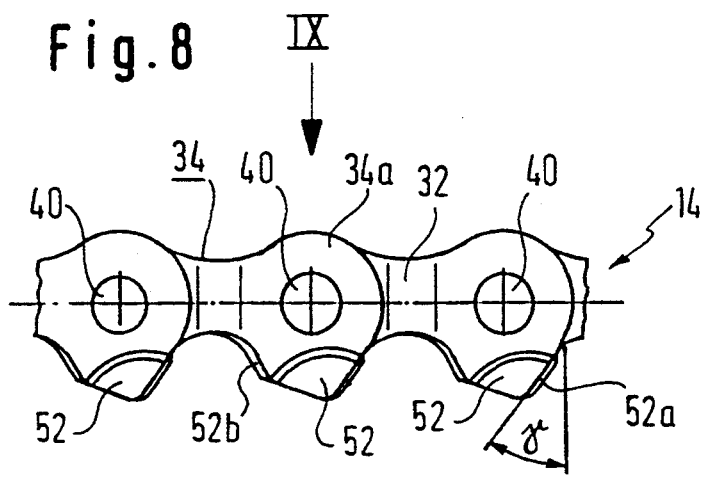
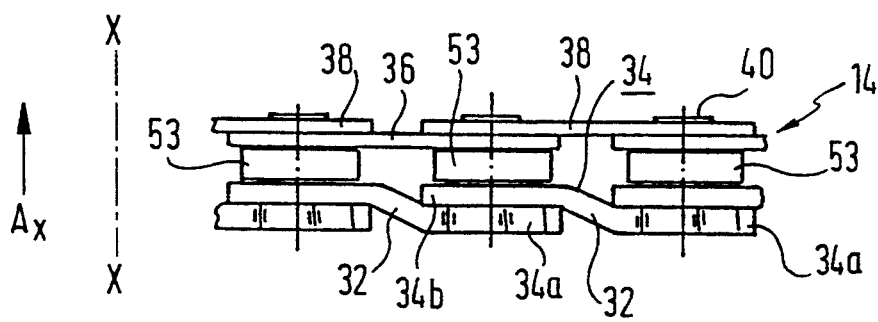
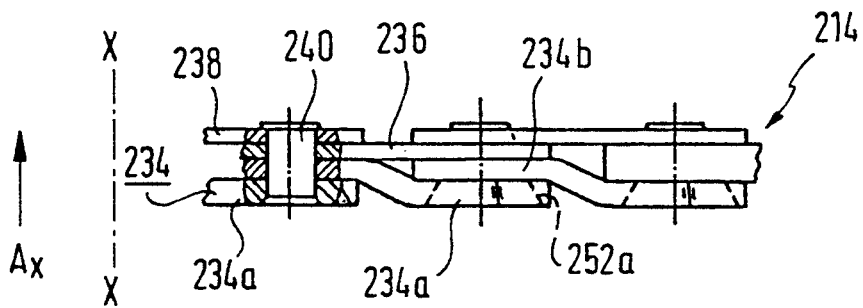

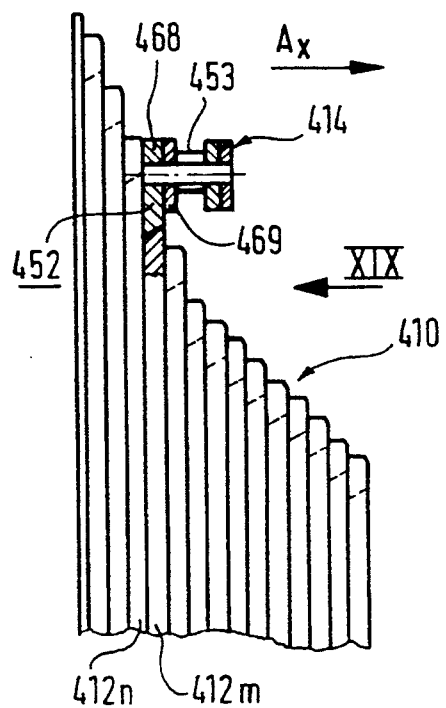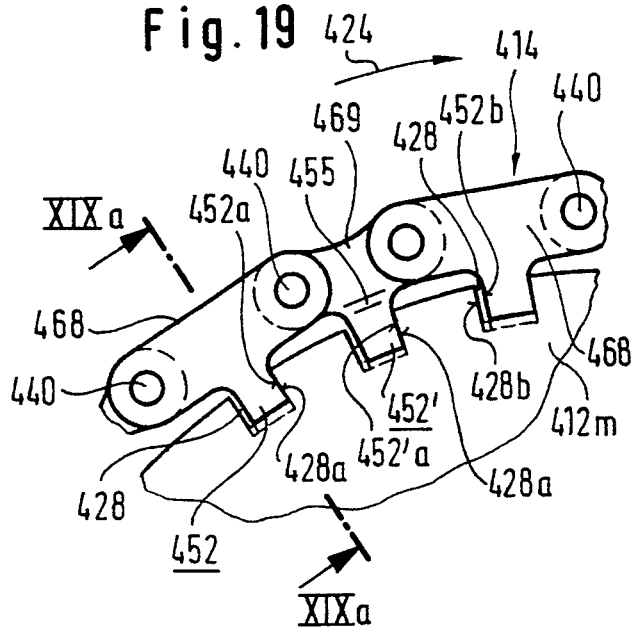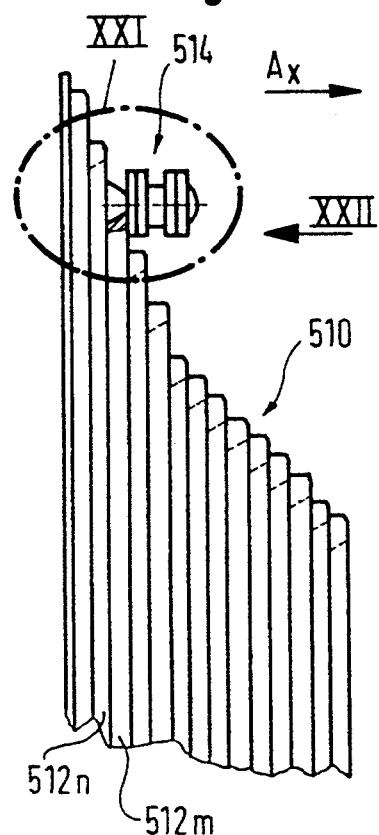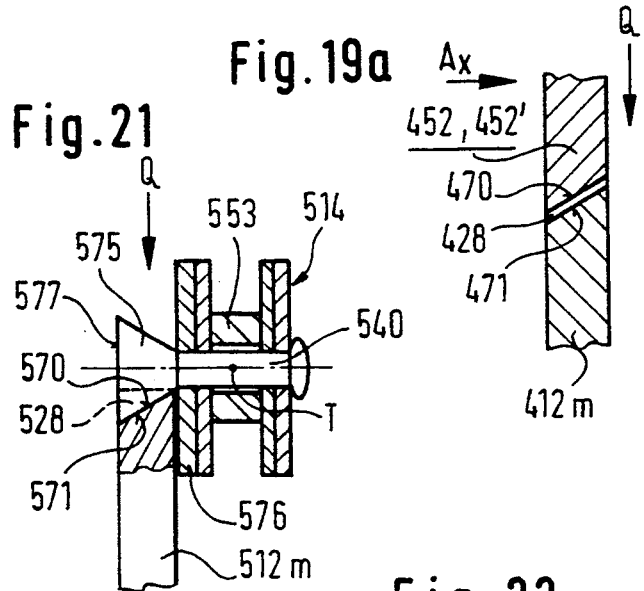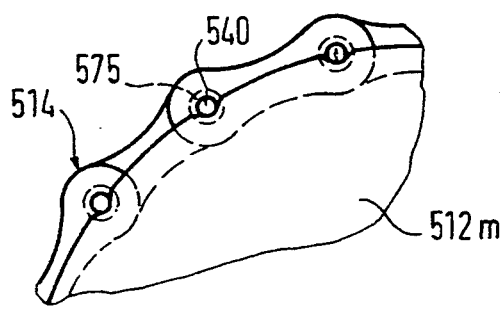

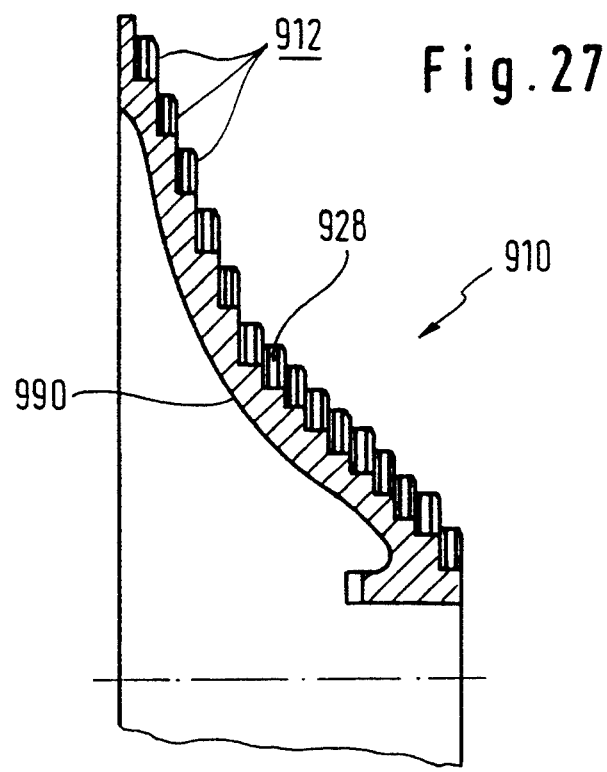
Fig. 27
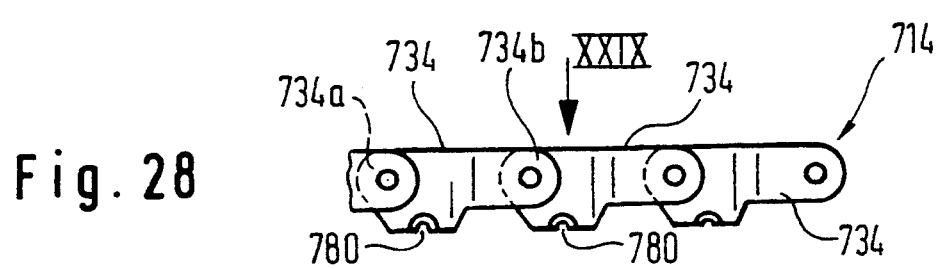
Fig. 28
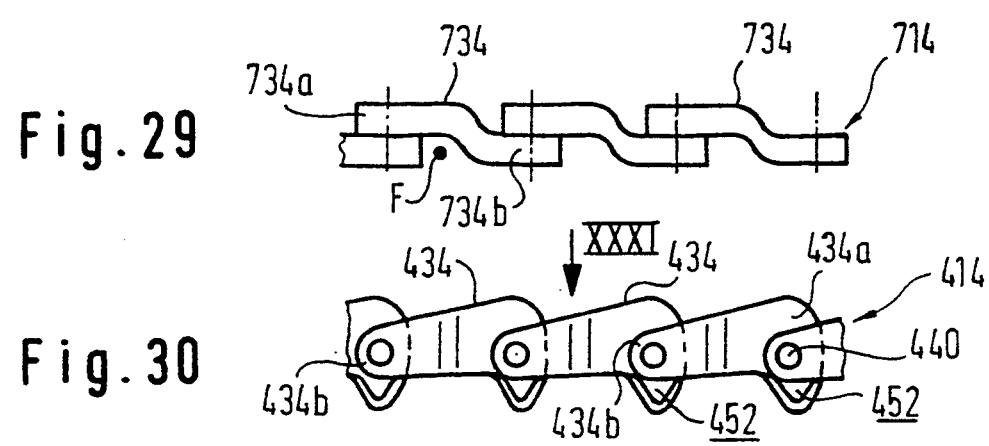
Fig. 29
Fig. 30
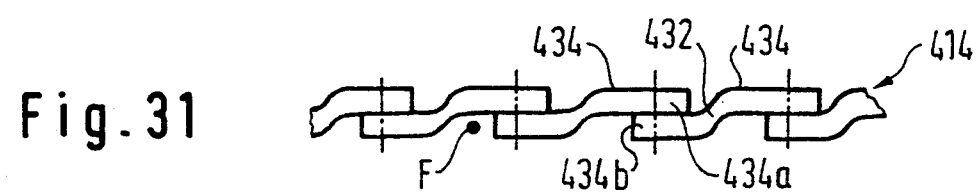
Fig. 31

5,362,278

CHAIN DRIVING MECHANISM FOR A BICYCLE OR THE LIKE

BACKGROUND OF THE INVENTION

This invention relates to a chain driving mechanism for a bicycle or the like comprising a wheel-side sprocket unit, a pedal crank-side sprocket unit and a chain drivingly connecting said sprocket units.

Modern gear change mechanisms of bicycles and the like have a large number of sprockets located at the driven wheel and connected with a free wheel mechanism. An increasing number of sprocket wheels is also provided on the shaft of a pedal crank. By this large number of sprockets and sprocket wheels one can fulfill the requirements to different special bicycles and more particularly with racing bicycles and mountain bicycles. By such a large number of sprockets and sprocket wheels one can obtain a great difference of the extreme transmission ratios. Moreover, one can also fulfill the requirement to obtain very small changes of transmission ratios between mutually adjacent transmission ratios.

By providing a plurality of sprockets not only at the rear wheel but providing in addition a number of sprocket wheels on the shaft of the pedal crank, one could obtain acceptable axial widths of the sprocket units and, nevertheless, obtain a factor 4 between the extreme transmission ratios.

OBJECT OF THE PRESENT INVENTION

It is an object of the present invention to further increase the number of possible wheel-side sprockets and/or pedal crank-side sprockets without further increasing the axial widths of the respective sprocket units. This aim should be obtained without increased difficulties of chain-sprocket engagement. Further, this aim should be obtained without the necessity of varying the axial spaces between the respective sprockets to be engaged and the adjacent sprockets on both sides.

Another object is to reduce the axial widths of the sprocket units at a given number of sprockets per sprocket unit.

A further object of the present invention is to provide a chain driving mechanism which is comparable as to reliability, constructional expenses and financial expenses with existing chain driving mechanisms.

Moreover, it is an object of the present invention to improve the readiness of the chain to move on a respective movement signal from an actually engaged sprocket to an elected further sprocket.

SUMMARY OF THE INVENTION

A chain driving mechanism for a bicycle or the like device comprises a wheel-side sprocket unit, a pedal crank-side sprocket unit and a chain drivingly connecting the sprocket units. At least one of the sprocket units comprises a plurality of sprockets, which sprockets are arranged side by side along an axis. These sprockets of said plurality comprise a first terminal sprocket with a maximum number of sprocket-side engagement means and a second terminal sprocket with a minimum number of sprocket-side engagement means. Possibly but not necessarily, further sprockets are provided axially between the first terminal sprocket and the second terminal sprocket with the number of sprocket-side engagement means of said further sprockets being smaller than the number of sprocket-side engagement means of said first terminal sprocket and larger than the number of sprocket-side engagement means of the second terminal sprocket. The number of sprocket-side engagement means of these further sprockets decreases from sprocket to sprocket in an axial direction directed from said first terminal sprocket to the second terminal sprocket. The chain is selectively engageable by chain engagement means with sprocket-side engagement means of a respective one of the sprockets. Chain transferring means are provided for causing the chain to engage a selected one of the sprockets.

Each of the sprockets has a respective sprocket middle plane perpendicular to the axis. On the other hand, the chain has a first enveloping side plane and a second enveloping side plane spaced from said first enveloping side plane along the said axial direction. Both enveloping side planes are substantially orthogonal to the axis. A virtual chain middle plane is substantially orthogonal to the axis and is located half-way along the axis between the enveloping side planes. The virtual chain middle plane is axially displaced in the said axial direction with respect to a respective sprocket middle plane of a sprocket drivingly engaged by the chain.

The term "sprocket" is to be understood in accordance with the present invention in a very general sense. It is not restricted to sprocket forms as they are used in older driving mechanisms of bicycles. This refers also to the term "a sprocket-side engagement means". Sprocket-side engagement means should not be understood in the restricted sense of the usual teeth on older sprockets used in bicycle driving mechanisms. The same is true for chain-side engagement means. This term is also to be understood in a broad sense and is not restricted to the usual intervals between subsequent pivot bolts of usual bicycle chains.

Chain transferring means is also to be understood in a broad sense. It covers all mechanisms useful for changing the chain between wheel-side sprocket and pedal crank-side sprockets.

A sprocket having a maximum number of sprocket-side engagement means corresponds to, but is, however, not restricted to a sprocket with a maximum number of teeth and corresponds normally to the sprocket of maximum diameter.

A sprocket with a minimum number of sprocket engagement means corresponds to, but is, however, not restricted to a smaller diameter sprocket having a smaller number of teeth of conventional design. Correspondingly, the term "chain engagement means" is to be understood in a broad sense such that these chain-side engagement means are compatible with all possible types of sprocket-side engagement means.

The terms "first and second enveloping side planes" will be defined within the particular description with reference to the drawings. The same is true for a virtual chain middle plane.

Thanks to the axial displacement of the virtual chain middle plane in the above defined axial direction with respect to a respective sprocket middle plane of a sprocket drivingly engaged by said chain, it is possible to obtain a minimum distance between subsequent sprockets. This is due to the fact that the chain having a certain unavoidable axial width (distance between the first and the second enveloping side planes) due to its design features can project in axial direction (as defined above) beyond the respective sprocket in which the chain engages. Thus, the axial space required by the chain on the other side of the respective engaged sprocket, i.e. towards a neighbouring sprocket of larger diameter, can be reduced at a minimum. This allows the sprockets to be located with minimum axial distance from each other or even without any distance from each other. This, on the other hand, results in reduction of the axial width of the sprocket unit at a given number of sprockets. This advantageous result is obtained without the risk that the chain comes in conflict with a sprocket neighbouring to the respective engaged sprocket and more particularly with the respective neighbouring sprocket which has a larger number of sprocket-side engagement means and, therefore, a larger diameter.

The displacement of the virtual chain middle plane with respect to the respective sprocket middle plane may be at least 15% of the axial distance of the above defined enveloping side planes. Beyond this it may correspond to at least 30% of the axial distance and even to at least 40% of the axial distance of the enveloping side planes.

The sprocket-side engagement means may comprise pockets between respective circumferentially subsequent pocket confining portions of the respective sprocket. These pockets are open at a circumferentially outer edge of the respective sprocket in radially outward direction. On the other hand, the chain-side engagement means may comprise projections which are directed towards an internal loop space surrounded by the chain in its operational configuration.

These projections are adapted in shape to the pocket so that they are engageable into these pockets. The pockets may have two circumferentially spaced, oppositely directed torque transmitting flank faces for torque transmitting engagement with respective flank faces of a respective projection.

This design is basically different from older designs in which teeth of the respective sprocket engage between two subsequent roller members surrounding subsequent pivot rollers of the chain. A main difference is that one can allow to the projections freely selectable freedom of axial movement with respect to the respective chain engaged sprocket. This freely selectable freedom of axial movement must be obviously restricted to such a degree that an unintended displacement of the chain with respect to a predetermined sprocket cannot occur in operation. On the other hand, the freedom of axial movement is selectable much greater than with conventional chain driving mechanisms, in which the axial freedom of movement in case of a gear change is restricted to a very high and non-avoidable degree by the engagement of the sprocket teeth into intervals of the chain between subsequent pivot bolts, which intervals are on both sides confined by a link member. Thus, according to the present invention, the transition of the chain from a predetermined sprocket to a newly selected sprocket can be facilitated to a high degree.

The torque transmitting flank faces have to transmit the driving torque from the chain to the sprockets of the wheel-side sprocket unit. These torques may be of considerable magnitude, particularly in mountain bikes. It should, therefore, be taken care that a flank face of the pocket which is intended for torque transmission in a normal forward driving operation should be as far as possible approximated to a radial direction. It is possible that the flank faces charged by the transmitted torque in forward drive direction are approached to said radial direction by accepting a less approximation of the other rearward torque transmitting flank faces to such radial direction. One must consider that in the rearward drive operation there is only very small torque to be transmitted from the chain to the respective wheel-side sprocket so that a larger deviation of said other flanks from a radial line does not interfere with a reliable operability of the bicycle. Even when one further takes into consideration that these "other flank faces" of the chain-side engagement means may be charged by the torque to be transmitted in forward direction, when in engagement with a pedal crank-side sprocket wheel, this is acceptable, too, because the circumferential length of engagement of the chain with a pedal crank-side sprocket wheel is, as a rule, considerably larger than the length of engagement with a wheel-side sprocket so that the torque transmission capability in the engagement zone between the chain and the pedal crank-side sprocket wheel is sufficient, even when said other flank faces of the chain engagement means has a relatively large angular deviation from a radial line through the axis of the pedal crank shaft.

It is also to be noted that at least with certain types of sprocket-side engagement means and chain-side engagement means, the engagement conditions may be variable according to the diameter of the selected sprocket. It is easily possible to provide the different sprockets in such case with different shapes of pockets, so as to adapt these pockets to the varying angular positions of subsequent projections, when the diameter of the sprocket is changed.

The pocket and the projections may have—when regarded in the axial direction—a substantially trapezoidal shape. A further possibility is to provide these projections with a triangular shape such that one point of the respective triangle is directed towards said internal loop space as defined above.

The projections may further have a substantially rectangular shape.

The shape of the projections is preferably selected such that the sensitivity of the engagement conditions between chain and sprocket in dependence of varying sprocket diameter is at a minimum.

The projections may be integral with link members of the chain, which link members may be substantially parallel to the first and second enveloping side planes. This is a feature of utmost importance, because one can give to the projections when being integral parts of such link members highly varying shapes, e.g. by stamping operation when manufacturing the link members, and one can so select the optimum engagement conditions between the pockets on the one hand and the projections on the other hand, particularly with the aim of obtaining maximum torque transmitting engagement faces and, as a result thereof, minimum engagement pressures and wear.

The type of chains is variable to a high extent. E.g., the chain may comprise a group of substantially identical link members of—when regarded in a direction parallel to the enveloping side planes and orthogonal with respect to a plane containing subsequent pivot axes of the chain-cranked shape such that each link member of said group has two axially displaced link portions, namely a first link portion closer to said first enveloping side plane and a second link portion more remote from said enveloping side plane. With such a design, a first link portion and a second link portion of two circumferentially subsequent link members may be arranged in overlapping relationship and interconnected by a pivot bolt. Then, the first link portion can be integral with respective projections directed toward the above defined internal loop space, and these integral projections may again be engageable with respective sprocket-side engagement means of the respective sprockets. Thus, the first portions of the link members can be approached to a neighbouring sprocket of larger diameter and maximum axial overlapping of the respective flank faces of the sprocket-side engagement means and the chain-side engagement means is obtained.

With the aim of easily transmitting high torques, the first link portions integral with the projections are preferably the leading portions of the link members at a normal forward driving operation. This is due to the fact that in such a design the longitudinal tension of the chain draws the projections into the respective pockets and thus secures the interengagement of torque transmitting flank faces of the sprocket-side engagement means and the chain-side engagement means.

It is to be noted that the flank faces of the chain-side engagement means and of the sprocket-side engagement means which are responsible for rearward torque transmission are not necessarily interengaged, when the torque transmission faces responsible for torque transmission on forward drive, are engaged. Preferably, there is provided a certain circumferential play between the chain-side engagement means and the sprocket-side engagement means. This is true for all embodiments of the present invention.

Referring now to the above discussed design of links with cranked link members it is understandable that these cranked link members may be the only components of the chain besides the pivot means by which subsequent cranked link members are interconnected. Such, the chain is very flexible with respect to deformation out of the above defined enveloping side planes. This may be of considerable advantage, when the chain is to connect wheel-side sprockets and pedal crank-side sprocket wheels which are spaced from each other in axial direction.

It may, nevertheless, be desirable for certain applications to further strengthen the above defined chain made of subsequent cranked link members. This chain may comprise a group of further link members extending between subsequent pivot bolts. These further link members may comprise outer further link members and inner further link members in alternating arrangement between subsequent pairs of pivot bolts. In this case, each pivot bolt may extend through a pair of cranked link members on the one hand and a pair of an inner further link member and an outer further link member on the other hand. This design has further advantageous design possibilities. There may be a free engagement section of the pivot bolts between the respective second portion of a cranked link member and the respective inner further link member. This engagement section may then be used for engagement between two subsequent teeth of a conventional sprocket. Thus, the chain can be used also with conventional sprockets or e.g. in a construction in which the rear wheel sprockets are provided with sprocket-side engagement means of the present invention, and the sprocket wheels on the pedal crank shaft are provided with conventional engagement means. It is even possible to provide roller members around the engagement sections of the pivot bolts.

A further improvement of such a chain is obtained, when a sleeve member is provided and surrounds a respective pivot bolt. This sleeve member may be axially shorter than the pivot bolt. Then, the pivot bolt may be received by bores of the first portion of a respective cranked link member and of an outer further link member. On the other hand, a second portion of a respective cranked link member and the respective inner further link member may be provided with bores adapted to and accommodating the sleeve member. The sleeve member may be then used for assisting a riveting operation when fastening the pivot bolts with respect to the link members. Moreover, the second portion of the respective link member and the inner further link member may be rotatable with respect to the sleeve member about a pivot axis. Thus, this pivotability cannot be influenced by the riveting operation.

A further chain design is as follows: The chain may comprise engagement link members having integral projections as chain-side engagement means provided adjacent both ends of the engagement link members. Interconnecting link members are provided for interconnecting respective subsequent engagement link members. In this case, the engagement link members may be closer to the first terminal side plane than the interconnecting link members. Thus, one obtains again a design in which the integral projections have a considerable overlapping in axial direction with the sprocket-side engagement means.

According to a still further design, the chain comprises a group of first link members close to the first terminal side plane and a group of second link members. Two subsequent first link members are interconnected by a respective second link member. The second link members overlap respective first link members on the side thereof remote from said first enveloping side plane. The first link members are integrally provided with projections directed toward the above defined internal loop space. These projections may be located e.g. substantially half-way between circumferential end portions of said first link members. The second link members may be provided with further projections also directed towards said internal loop space. These further projections may also be provided substantially half-way between respective end portions of the respective second link members. These further projections may be cranked with respect to the respective second link member such that said further projections of said second link members are substantially coplanar with said projections of said first link members. Such, all projections have a optimum axial overlapping with the respective engagement means of the sprocket.

The chain may comprise in accordance with well known prior art a plurality of pivot bolts with a free engagement section between two axially spaced link members, such as to be engageable with usual chain sprockets having teeth for engagement between subsequent pivot bolts. These pivot bolts may be optionally surrounded by roller members. This design is possible with all types of chain as discussed in connection with the present invention. The advantage is again, as mentioned above, that the chain can be used not only in connection with sprocket-side engagement means of the present invention but also in connection with conventional sprockets having teeth engaging between subsequent pivot bolts and laterally confined by respective link members.

According to a further embodiment of the invention, the chain-side engagement means may comprise chain-side engagement studs projecting in a direction opposite to said axial direction beyond respective link members of said chain, which are axially adjacent the respective chain engaged sprocket. These engagement studs may be engageable with respective pockets at the circumferential edge of the respective sprocket. This embodiment allows again a maximum overlapping in axial direction of the sprocket-side engagement means and the chain-side engagement means. It further allows closest mutual approach of adjacent sprockets down to a zero distance.

A still further embodiment provides sprocket-side engagement means shaped as pins on the respective sprocket. These pins project in the above defined axial direction. The chain-side engagement means comprise in this embodiment recesses for accommodating said pins. These recesses are open toward the above defined internal loop space of the chain. The recesses may be provided in respective edges of link members of the chain, which may be located closely adjacent the respective sprocket carrying said pins.

It has been mentioned above that one must take care of securing the chain against unextended axial movement with respect to the respective chain engaged sprocket.

Securing means for preventing such unintended axial movement of the chain may comprise cooperating undercut means of the sprocket-side engagement means on the one hand and of the chain-side engagement means on the other hand. These undercut means may be wedge-shaped undercut means and/or stepped undercut means.

The undercut means, particularly the wedge-shaped undercut means, of the chain-side engagement means and the sprocket-side engagement means may be such that the chain is urged in response to operational load in a direction opposite to the axial direction as defined above toward abutment with an abutment face. This abutment face may be the respective chain engaged sprocket or the subsequent sprocket of larger diameter or an intermediate disc provided side by side with a sprocket.

The undercut means may be provided by torque transmitting flank faces of the chain engagement means and the sprocket-side engagement means, which are responsible for transmission at a normal forward driving operation. This design is particularly possible, when the chain-side engagement means are provided with projections as integral parts of respective link members. One can obtain the undercut by stamping the link members in a direction deviating from a direction orthogonal to the respective link member. The operational result of such a construction is that the chain is urged towards the abutment face with increasing axial force, when the chain tension is increased in response to increasing torques to be transmitted. This gives a very high security against unintended axial displacement of the chain in a most critical situation.

The undercut means may, however, also be provided between torque transmitting flank faces of the sprocket-side engagement means and the chain-side engagement means which are responsible for torque transmission in rearward driving operation. This makes sure that the chain is also secured against axial displacement with respect to a pedal crank-side sprocket.

Further, it is possible that the undercut means are provided between radially opposite faces of the chain engagement means and the sprocket engagement means. This is due to the fact that on loading the chain by a torque to be transmitted the linear chain tension results in radially inwards directed forces urging the chain towards the axis of the respective sprocket. These radially inwards directed forces are then responsive for maintaining engagement of the undercut means provided at radially opposite faces of the chain engagement means and the sprocket-side engagement means.

In case of the above-mentioned studs provided on the chain and also in case of the above-mentioned pins provided on the sprocket, these pins and studs, respectively, may be provided with conical faces or part-conical faces for obtaining the undercut engagement.

A securing function may further be provided with radially outwards open pockets of the sprocket-side engagement means, in that the pockets are closed at least partially in said axial direction. The degree of closure may be selected such as to obtain an optimum compromise between an easy chain transport between different sprockets, on the one hand, and reliable securing of the chain against unintended axial movement with respect to the engaged sprocket, on the other hand.

A fully or a partially closed side wall of the pocket may be obtained by sandwiching two half sprockets which define the pockets therebetween. The half sprockets may be provided with half pockets which are registered with each other in circumferential direction and form the pockets. The half pockets may be obtained e.g. by stamping or coining. The half sprockets may be of identical shape.

A further possibility is to shape the pockets into an integral sprocket unit base member which is common to a plurality of sprockets and provides the sprocket-side engagement means of this plurality of sprockets.

It is also possible to secure the chain against unintended axial movement by covering the pockets in the above defined axial direction by a respective cover disc.

The present invention further considers the following problem: The chains applicable according to the present invention comprise pivot bolts extending in a direction opposite to said axial direction toward a neighbouring sprocket, i.e. toward a sprocket neighboured to the respective chain engaged sprocket and having a larger diameter than the respective chain engaged sprocket. The end portions of these pivot bolts located adjacent this neighbouring sprocket may come into contact with the neighbouring sprocket and prevent a maximum overlapping of the sprocket-side engagement means and the chain-side engagement means, if adjacent sprockets are arranged at minimum or zero axial distance. For overcoming this problem one may locate the pivot bolts such that their end portions located adjacent to the neighbouring sprocket are located radially outside of said neighbouring sprocket. This is easily possible, when two axially adjacent sprockets have a small difference in diameter. At such relatively small difference of the diameters of adjacent sprockets it is easily possible to locate the pivot bolt ends of the chain engaging a smaller sprocket radially outside of the external circumference of the neighbouring sprocket of larger diameter.

On the other hand, the diameter difference between subsequent large diameter sprockets may be larger, because the difference of the respective sprocket-side engagement means (number of teeth) must be increased for obtaining desired relationships between the respective transmission ratios. In such case, it is not always possible to locate the pivot bolts of a chain engaging a predetermined sprocket radially outside of the external circumference of a neighbouring sprocket having larger diameter. One can, however, overcome the problem also in this latter case. One possibility of overcoming this problem is to shape the end portions of the pivot bolt such as to have end faces substantially coplanar with a side face of a respective link member facing the neighbouring sprocket of larger diameter. One can obtain this in providing counter-sunk bores through the link members and to shape the end portion such as to fill said counter-sunk bores and not to project axially beyond them.

A further possibility of solving this problem is obtained by providing the respective link members with an engagement face zone adjacent the neighbouring sprocket and a bolt penetration face zone radially outwards of said engagement face zone. This bolt penetration face zone is axially displaced with respect to the engagement face zone in the above defined axial direction. Such, a respective end portion of the respective pivot bolt may extend axially beyond the respective bolt penetration face zone without extending beyond the respective engagement face zone.

The axial displacement of the engagement face zone and of the bolt penetration face zone may be obtained by using link members having increased axial width adjacent the internal loop space as defined above.

Another possibility of providing said engagement face zone and said bolt penetration face zone consists in giving to said respective link member a crank figuration.

A further possibility of avoiding the problem of interference of pivot bolt end portions with neighbouring sprockets consists in providing spacer discs between at least a part of pairs of axially subsequent sprockets within a sprocket unit. These spacer discs are preferably introduced only between subsequent sprockets which have a relatively large diameter difference.

According to a further aspect of the present invention, it is not absolutely necessary that the virtual chain middle plane is axially displaced in the above defined axial direction with respect to the respective sprocket middle plane of the sprockets drivingly engaged by the chain. Even if this is not fulfilled, it may be of high advantage, if the sprocket-side engagement means comprise pockets between respective circumferentially subsequent pocket confining portions of the respective sprockets and if said chain-side engagements means comprise projections which are directed towards the internal loop space surrounded by the chains. This is particularly true, if these projections are integral with link members of the chain, which link members are substantially parallel to the plane of a chain loop.

Further, the application of the chain design consisting of the above discussed identical and cranked link members is applicable even when the virtual chain middle plane is not displaced axially with respect to a respective sprocket middle plane of a sprocket drivingly engaged by the chain.

Moreover, the design comprising laterally extending engagement studs of the chain, which are engageable with respective pockets at the circumferential edge of the respective sprocket, is independent of the feature of said virtual chain middle plane being axially displaced with respect to the engaged sprocket middle plane.

The same is true for the design in which the sprockets are provided with laterally projecting pins, and the chain is provided with recesses for engagement with said pins.

Also, the various aspects of securing means preventing unintended axial disengagement of the sprocket-side engagement means and the chain-side engagement means are applicable with or without the concept of said virtual chain middle plane being axially displaced with respect to the sprocket middle plane.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to embodiments shown in the accompanying drawings in which

FIG. 2 is an end view according to arrow II of FIG. 1;

FIGS. 3a to 3e show the engagement of a bicycle chain with a rear wheel sprocket of a rear wheel multi-sprocket unit according to various embodiments of the present invention;

FIG. 4 shows a section according to line IV—IV of FIG. 3a of the bicycle chain with a portion of a sprocket allocated thereto;

FIG. 5a shows a section according to line V—V of FIG. 3a with the bicycle chain in engagement with a large diameter sprocket;

FIG. 5b shows a section according to line V—V of FIG. 3a with a bicycle chain in engagement with a sprocket of smaller diameter;

FIG. 5c shows a section according to line Vc—Vc;

FIG. 7 shows a modification of the chain according to FIG. 4, again along a section line IV—IV of FIG. 3a;

FIG. 8 shows a side view of the chain according to FIGS. 4 and 7 with the pivot bolt end faces being coplanar with side faces of link members penetrated by said pivot bolts;

FIG. 9 shows a view of the chain according to FIG. 8 according to arrow IX of FIG. 8, said chain of FIG. 9 being of the type as shown in FIG. 4;

FIG. 10 shows a view corresponding to the view of FIG. 9 with a chain of the type as shown in FIG. 7;

FIG. 18 shows a further type of sprocket unit with a chain engaged therein;

FIG. 19 shows a view on the embodiment of FIG. 18 in the direction of arrow XIX of FIG. 18 with only one sprocket being shown;

FIG. 19a shows a diagrammatic section according to line XIXa—XIXa of FIG. 19;

FIG. 20 shows a still further embodiment of a sprocket unit with a chain engaged therein;

FIG. 21 shows a detail at XXI of FIG. 20;

FIG. 22 shows a side view according to arrow XXII of FIG. 20 with only one sprocket being shown;

FIG. 27 shows a section through a sprocket unit base member with a plurality of sprockets integrated therein;

FIG. 28 shows a side view of a chain adapted for cooperation with a sprocket unit of FIG. 23 as an alternative for the chain as shown in FIGS. 23 and 24;

FIG. 29 shows a top view on FIG. 28 in the direction of arrow XXIX of FIG. 28;

FIG. 30 shows a side view of a chain adapted for engagement of the sprocket of FIG. 15 as an alternative for the chain according to FIGS. 15 to 17 and FIG. 31 shows a top view in the direction of arrow XXXI of FIG. 30.

DETAILED DESCRIPTION OF THE PREFERRED EMBODIMENTS

Figure 1:
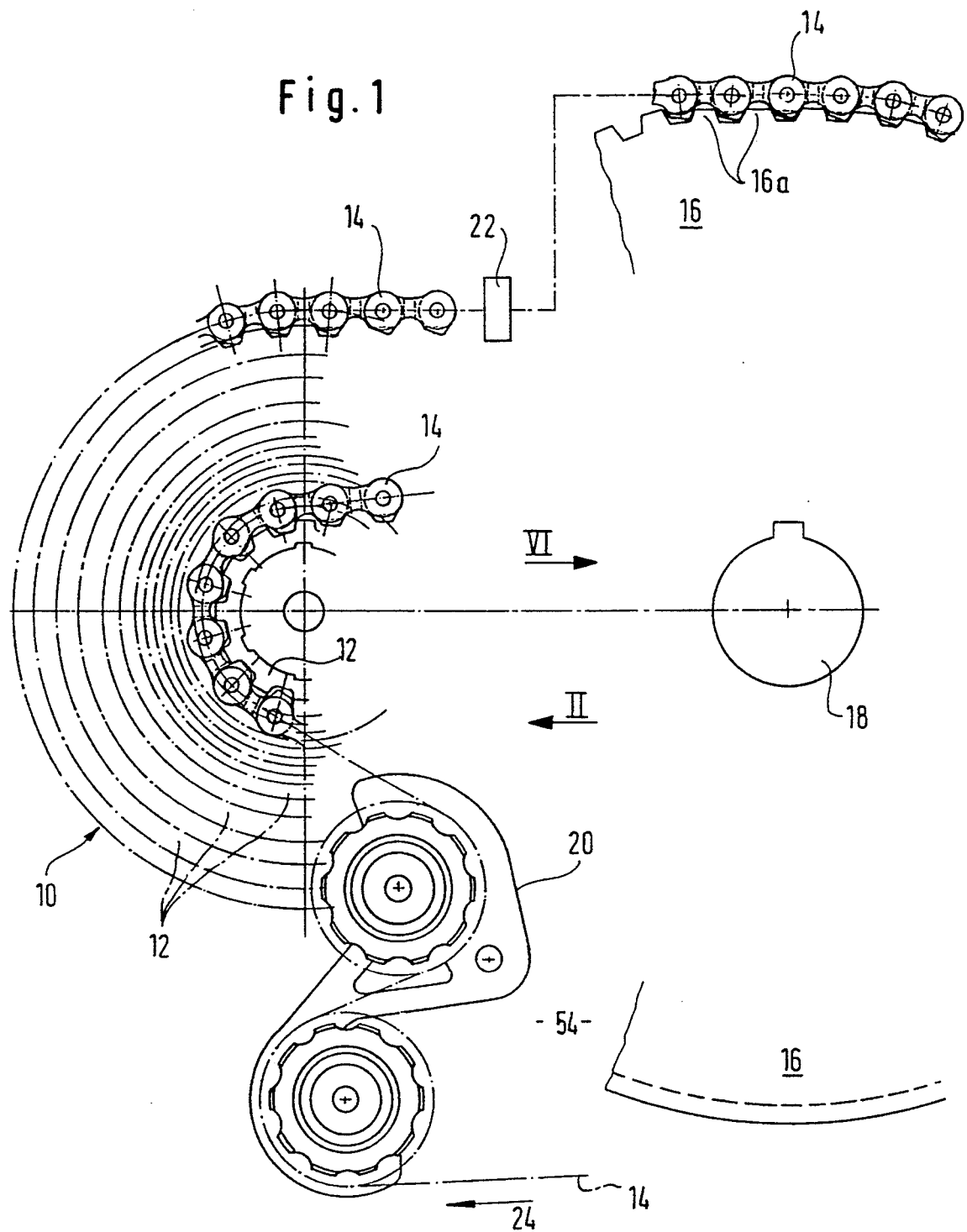
FIG. 1 is a side view of a chain driving mechanism of this invention, as regarded in axial direction of the rear wheel of a bicycle.

In FIG. 1, one can recognize a rear wheel sprocket unit 10 of a bicycle comprising a plurality of coaxial sprockets 12. These sprockets are connected by a free wheel unit (not shown) with a rear wheel bicycle hub of the respective bicycle. It is also possible that the sprocket unit 10 is directly fastened onto a rear wheel bicycle hub. A chain 14 is in driving engagement with a sprocket 12a of the sprocket unit 10. This chain 14 is simultaneously in engagement with a sprocket wheel 16 fastened on a shaft 18 of a pedal crank drive.

The chain 14 is engageable with selective sprockets 12 of the sprocket unit 10 by a chain transferring unit which is axially movable in a direction perpendicular to the drawing plane of FIG. 1 by a switch accessible to the driver's hand and connected with the transferring unit 20 by e.g. a Bowden wire. By axial movement of the chain transferring unit 20 the chain can be caused to move from the sprocket 10a to a desired sprocket, so changing the transmission ratio.

The chain transferring unit 20 comprises spring biased compensating means for compensating the length of the chain in accordance with the selected sprocket 12.

The sprocket wheel 16 may also be a member of a group of sprocket wheels forming a sprocket unit fastened on the pedal crank shaft.

The chain transferring unit 20 may be operationally connected with a further chain mover unit 22. While the chain transferring unit 20 is provided at the entrance of the chain 14 into the sprocket unit in the direction of arrow 24 corresponding to forward drive condition, the additional chain mover unit 22 is located at the exit of the chain 14 from the sprocket unit 10.

The additional chain mover unit 22 may be synchronized for axial movement with the axial movement of the chain transferring unit 20 in a direction perpendicular to the drawing plane of FIG. 1.

In FIG. 2 one recognizes again the chain 14 in driving engagement with a minimum diameter sprocket 12a.

In FIG. 3a the engagement situation of the chain 14 with the sprocket 12a can be seen in more detail.

The sprocket 12a is located between a further sprocket 12b of larger diameter and a terminal disc 26 directly adjacent the sprocket 12a. Besides the sprockets 12a and 12b a still further sprocket 12c is shown with still larger diameter. The sprocket 12a is provided as shown in FIGS. 4 and 5b with pocket 28 between subsequent teeth 30. The direction of movement of the chain 14 is again designated by the arrow 24 corresponding to the arrow 24 of FIG. 1.

The chain 14 comprises, as can be best seen from FIG. 4 and 5b, a plurality of cranked link members 34 which are cranked at 32, such as to form first link portions 34a and second link portions 34b with the first link portion 34a and the second link portion 34b of circumferentially subsequent link members 34 being circumferentially overlapped. The chain 14 further comprises link members 36 and 38. The link members are pivotally interconnected by pivot bolts 40 having pivot axes 40a. Each pivot bolt interconnects four link members, namely a first end portion 34a of a cranked link member 34, a second end portion 34b of a circumferentially adjacent link member 34, an inner link member 36 and an outer link member 38. The pivot bolt 40 is pressed into a bore 44 of a first end portion 34a and a bore 44' of the outer link member 38. A sleeve member 46 is surroundingly seated on the pivot bolt 40 and preferably non-rotatable with respect to the pivot bolt 40. The sleeve member 46 is helpful for riveting the pivot bolt 40 when having been brought in place as shown in FIG. 4. The second end portion 34b and the inner link member 36 are provided with bores 48 and 48', respectively, by which this second end portion 34b and said inner link member 36 are rotatably mounted on the sleeve member 46.

Roller members 53 are rotatable on engagement sections of the sleeve member 46 axially between the second end portions 34b and the inner link member 36.

As can be seen from FIG. 5b, the first end portions 34a of the link members 34 are provided with radially inward directed projections 52, which are integral with the link members 34. These projections 52 are directed towards a chain loop confined space 54, as shown in FIG. 1. Each projection 52 has a first torque transmitting flank face 52a and a second torque transmitting flank face 52b. The first torque transmitting flank face 52a is the torque transmitting flank face, when in normal forward drive operation the chain is moving along the arrow 24 and is transmitting a torque to the sprocket 12a. The first flank face 52a is cooperating with a first flank face 28a of the pocket 28 in the forward drive operation according to arrow 24. The second flank face 52b of the projection 52 is cooperating with a flank face 28b of the pocket 28 in rearward drive operation.

One can recognize from FIG. 5b that the flank face 28b follows substantially the radial direction 13 while the flank face 28b defines a considerable angle of the radial line 13'. It is most important that the angle between the flank face 28a and the radial line 13 is small in order to be able to transfer high torque from the flank face 52a to the flank face 28a in forward drive condition.

One can recognize in FIG. 4 a first enveloping side plane E1 and a second enveloping side plane E2, said side planes E1 and E2 accommodating between them the total axial width of the chain 14. One can recognize this enveloping side planes E1 and E2 also in FIG. 3a. One can further recognize in FIG. 3a a middle plane $E_m$ of the sprocket 12a and a virtual middle plane $E_v$ located half-way between the enveloping side planes E1 and E2. One can recognize that the virtual middle plane $E_v$ of the chain 14 is axially spaced from the middle plane $E_m$ of the sprocket 12a with which the chain 14 is in engagement. As a result thereof one can see that in spite of the considerable axial width E1–E2 of the chain 14, this chain can be brought into engagement with the sprocket 12a without interference with the neighbouring sprocket 12b having a larger diameter than the engaged sprocket 12a.

One can see particularly from FIG. 4 that the torque transmitting flank faces 52a of the projections 52 are inclined by an angle α with respect to a reference line N which is parallel to the pivot axis 40a. The flank face 28a of the pocket 28 is correspondingly inclined, as one can see from the portion of the sprocket 12a indicated at the lower end of FIG. 4. This pocket 28 in FIG. 4 is not shown in realistic position. In truth, the pocket 28 receives the projection 52, i.e. the sprocket member 12a is substantially coplanar with the first end portion 34a of the link member 34. It is to be shown, however, by the sprocket 12a in FIG. 4 that the flank faces 52a of the projection 52 and the flank face 28a of the pocket 28 are substantially parallel. One further can see that the flank face 52a of the projection 52 undercuts the flank face 28a of the pocket 28, when the projection 52 is received by the pocket 28. When the chain moves in the direction 24, as also shown in FIG. 4, i.e. in the forward drive direction, the chain 14 is urged in the direction of arrow P such that the projection 52 fully enters into the pocket 28 and abuts against the neighbouring sprocket 12b according to FIG. 3a. Thus, in normal drive operation, the chain 14 is urged in leftwards direction, as seen in FIG. 3a, and is secured against axial separation from the sprocket 12a. Such, the securing disc 26 is only a matter of precaution and is not absolutely necessary.

One can further see from FIG. 4 that the flank face 52b of the projection 52 is inclined with an angle β against a reference line N' and that the flank 28b of the pocket 28 is inclined by the same angle β with respect to the reference line N'. Such, also on a rearward driving motion of the chain 14 against the direction of arrow 24 the chain 14 is urged in the direction of arrow P toward the sprocket 12b and the sprocket 12c and is again secured against unintentional separation from the sprockets 12a.

One can further see from FIG. 3a that the projection 52 has a radially inner engagement face zone 52c engageable with an adjacent face of the neighbouring sprocket 12b. Moreover, the link portion 34a has a pivot bolt penetration face zone 34a1 through which an end portion 40e of the pivot bolt 40 extends. The pivot bolt penetration face zone 34a1 is axially offset with respect to the engagement face zone 52c so that the bolt extension 40a can be riveted above the pivot bolt penetration zone 34a1 and, nevertheless, the extension 40e does not interfere with the neighbouring sprocket 12b in spite of the pivot bolt 40 being in radial overlapping position with respect to the neighbouring sprocket 12b. The axial displacement of the zones 34a1 and 52c is the result of the projection 52 having a larger axial width than the link member 34a. The reduced axial width of the link member end portion 34a can be obtained by coining or stamping or by using corresponding blanks for the link members 34.

From FIG. 5b one can see that the leading portion 34a of the link member 34 is provided with the projection 52. This is of importance, because by the momentum exerted onto the link member 34, the projection 52 is urged in radially inward direction with the tip 52e being approached toward the bottom 28e of the pocket 28. This helps again to secure the engagement of the flank faces 52a and 28a.

In FIG. 5a one can see the chain 14 in engagement with a sprocket 12n of larger diameter. According to the larger diameter of the sprocket 12n, the link members 34 are more straightened than in the engagement condition of FIG. 5b. This makes it necessary to modify the pockets 28' such as to be compatible again with the projections 52. Thus, the flank face 52a can enter again in full face contact with the flank face 28'a in forwards drive operation, and the flank face 52b can again enter into full face contact with the flank face 28'b in rearwards drive operation. Moreover, the tip 28e of the projection 52 can abut again against the bottom 28'e of the pocket 28' under the tension in the chain 14. The triangular gap 28'f is the result of the modified mutual inclination of the link members 34. One recognizes that the inclination of the flank faces 52a and 28'a with respect to a radial line (compare radial line 13 of FIG. 5b) is larger in the case of the conditions of FIG. 5a. This is, however, acceptable due to the larger diameter of the sprocket 12n, because a greater number of engagement pockets 28' exists so that the torque to be transmitted in forwards drive operation is distributed to a larger number of pairs of flank faces 52a and 28'a.

The design of the chain as shown in FIG. 4 allows the chain 14 to be combined with a sprocket wheel 16 of conventional design with teeth 16a entering between subsequent roller members 53 in circumferential direction and between the cranked section 32 of a link member 34 and an inner link member 36 in axial direction. Thus, the chain 14 as shown in FIG. 4 can be used both with conventional sprocket units 14 and 16 on the one hand, and modified sprocket units according to the invention, as seen e.g. in FIG. 3a on the other hand. It is also possible to provide engagement between the chain and the sprockets 12 of the sprocket unit 10 by the projections 52 and the pockets 28 and to provide engagement of the chain 14 with the sprocket wheel 16 by engagement of the teeth 16a between subsequent roller members 53.

From FIG. 3b one can see that the axial distance between the axial engagement face zone 52c and the pivot bolt penetration face zone 34a1 can also be obtained by cranking the projection 52 with respect to the portion 34a of the link member 34. Thus, a rivet head 40e of the pivot bolt 40 can again be provided without interfering with the sprocket 12b.

FIG. 3C shows that the problem of interference between the rivet head 40a and the neighbouring sprocket 12b of larger diameter does not exist, when the diameter difference of the sprockets 12a and 12b is so small that the rivet head 40e of the pivot bolts 40 are located radially outwards of the neighbouring sprocket 12b. This is particularly true for the sprockets of smaller diameter. It can be seen from FIG. 11 that the sprockets 12 of smaller diameter be only small differences in diameter between subsequent sprockets. This group of sprockets with smaller diameter is designated by 10a. One recognize from FIG. 11 that the sprockets 12 within the group 10a are directly sandwiched in mutual engagement without any distance layers between subsequent sprockets 12. The reason why the diameter difference between subsequent sprockets 12 within the group 10a is small has been already explained: With small sprockets a difference of one pocket 28 between subsequent sprockets is already sufficient for providing a desired difference in transmission ratio. A difference of only one pocket per 360° results only in a small diameter difference.

Figure 11:
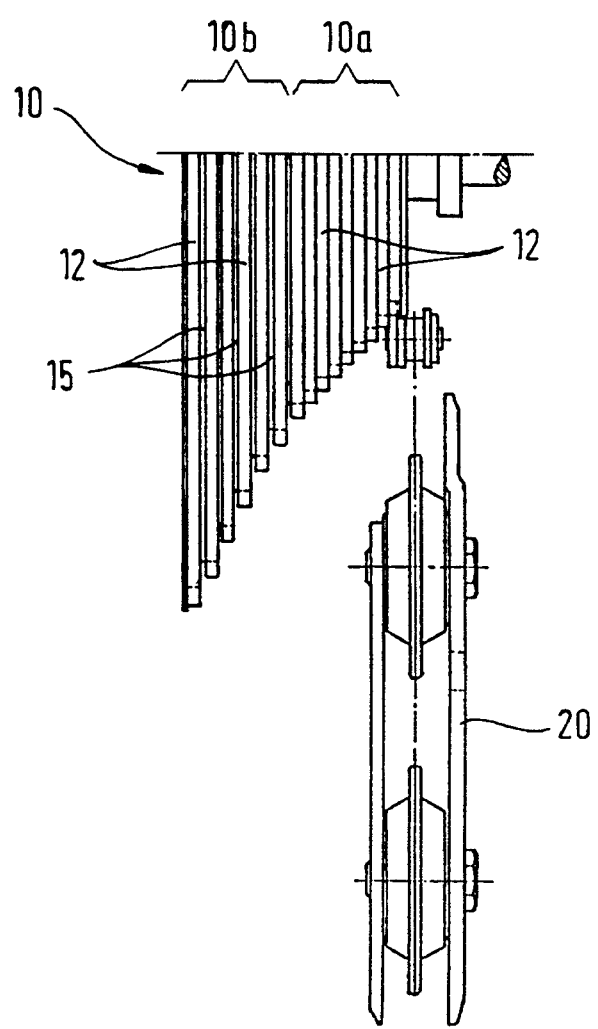
FIG. 11 shows a view corresponding to the view of FIG. 2 with a modified sprocket unit.

One can further see from FIG. 11 that in a second group 10b of sprockets 12, the diameter difference between neighbouring sprockets 12 is considerably larger. This larger diameter difference corresponds to the situation as shown in FIG. 3a and 3b. The reason for the larger difference in diameter is that for obtaining desired steps in the transmission ratio, it is necessary to make the difference of the number of pockets per 360° for immediately subsequent sprockets larger than 1. If this occurs, it is necessary to provide specific measures in order to avoid the interference of the rivet heads 40e with the respective neighbouring sprocket 12b.

A further possibility of avoiding such interference is indicated in FIG. 3d; here, spacer discs 15 are provided between subsequent sprockets 12a and 12b. One can recognize such spacer discs 15 in FIG. 11 between subsequent sprockets of the group 10b of larger diameter sprockets.

A still further possibility of avoiding interference between the rivet heads 40e and the neighbouring sprocket 12b is indicated in FIG. 3e. Here, the rivet heads 40e are completely accommodated within counter-sunk bores 44a of the link member portion 34a.

It is to be noted when regarding e.g. FIG. 3a that the transfer of the chain 14 between a predetermined sprocket and a newly selected sprocket is relatively easy. Assuming that the projection 52 is engaged with a pocket 28' of the neighbouring sprocket 12c, one can see that the projection 52 can easily be transferred to the pockets 28 of the neighbouring smaller sprocket 12a, because the pockets 28' are fully open in the axial direction $A_x$, when disregarding for a moment the inclination of the flank faces as shown in FIG. 4.

For transferring the chain 14 from a smaller sprocket 12a to a larger sprocket 12b, there is only to be overcome the diameter difference, but no further obstacle exists against a movement of the chain against the direction $A_x$.

For preventing the chain 14 to lose engagement with the sprocket 12a, the terminal disc 26 is provided. As one can see from FIG. 2, a further terminal disc 17 is provided adjacent the maximum diameter sprocket, such as to prevent the chain 14 to move beyond the sprocket 12z of maximum diameter in an axial direction opposite to the axial direction $A_x$.

Figure 6:
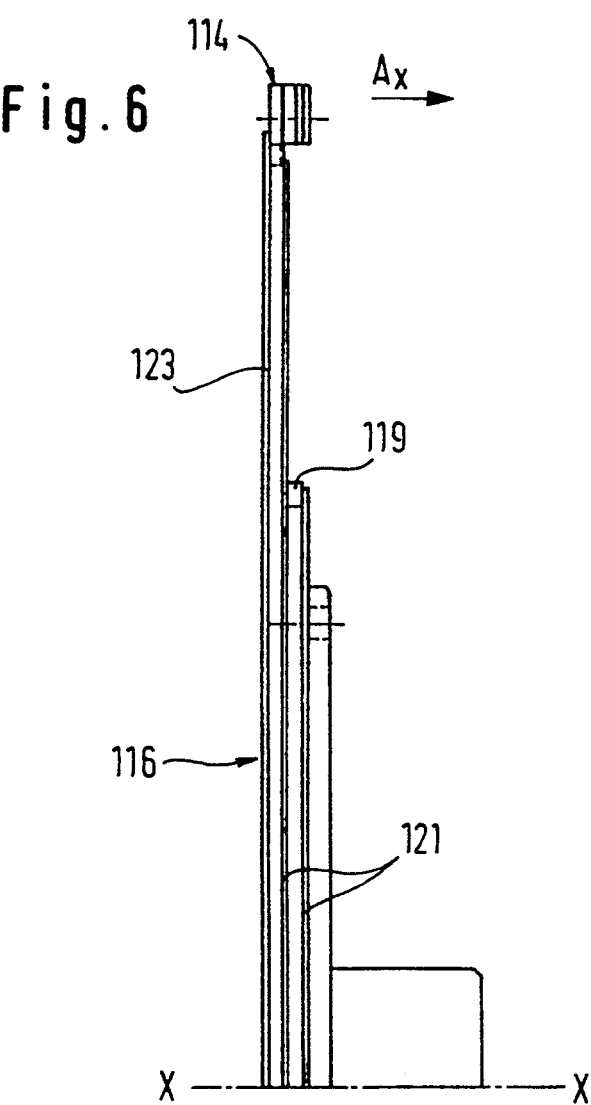
FIG. 6 shows an end view of a pedal crank-side sprocket wheel according to arrow VI of FIG. 1.
Figure 7:
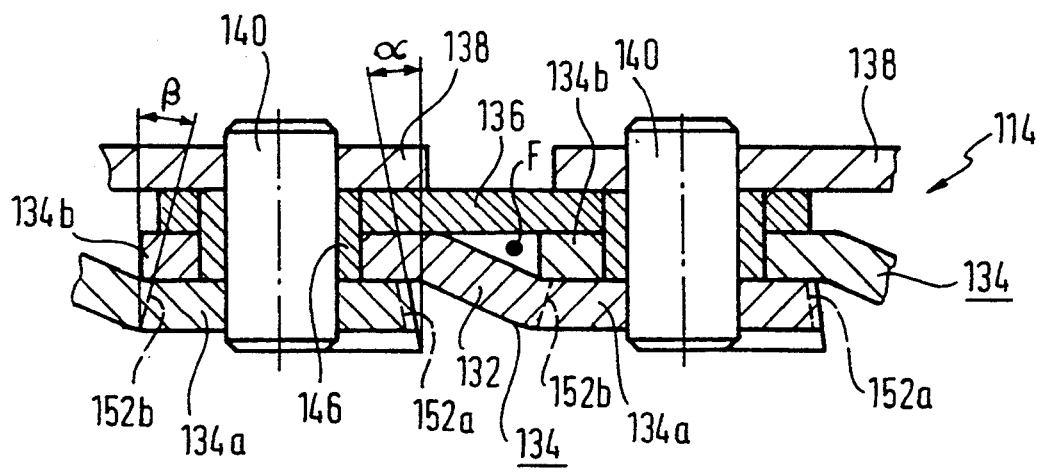

In FIG. 7 there is shown a further type of chain using again cranked link members 134. Analogous elements of this chain are designated by the same reference numerals as in FIG. 4 increased by 100. The only difference between the embodiments of FIG. 7 and the embodiments of FIG. 4 is that according to FIG. 7, the pivot bolts 140 are shorter along the axis X—X of the sprocket unit 10 as shown in FIG. 2 and that the roller members 53 of FIG. 4 are avoided. This chain of FIG. 7 requires a sprocket wheel unit 116 as shown in FIG. 6, in which the engagement means of the various sprockets are similar or identical with the pockets 28 between subsequent "teeth" as shown in FIG. 5b. As is further seen from FIG. 6, the chain 114 projects in the same direction $A_x$ beyond the respective engaged sprocket as in FIG. 3a. One can again say for the embodiment of FIG. 6 that the virtual middle plane $E_v$ is axially displaced with respect to the middle plane $E_m$ of the respective sprocket by a distance $E_m-E_v$ as in FIG. 3a. It is to be noted that in FIG. 6 the sprockets of the sprocket unit 116 also decrease in diameter corresponding to the number of engagement means, when proceeding in the direction $A_x$, this direction $A_x$ being the same direction as indicated in FIG. 3a.

One can further note that in FIG. 6 between subsequent sprockets spacer discs 121 are provided, which may have a similar function as the spacer discs 15 of FIG. 3d. In addition, these spacer discs 121 may further have the function of partially closing pockets 119 which pockets correspond to the pockets 28 of FIG. 5b, such as to prevent the unintended disengagement of the chain 114 from the respective sprockets by axial movement in the direction $A_x$. The size of the obstacle provided by the discs 121 may be selected such that, on the one hang unintended axial movement of the chain 114 in the direction $A_x$ is prevented and, on the other hand, the intended movement of the chain 114 is not prevented more than necessary.

In FIGS. 8 and 9, one can see again an elongated portion of the chain 14 with the cranked projection 52 as shown also in FIG. 3a and 3b. The angle $\delta$ as shown in FIG. 8 corresponds to the inclination of the flank face 52a with respect to the radial line 13 as shown in FIG. 5b taking into consideration that in FIG. 8 the chain 14 is straightened, whereas in FIG. 5b it is applied to a circular sprocket 12a.

One can further see from FIG. 8 in detail the undercut flank faces 52a and 52b, which are to engage the undercut flank faces 28a and 28b of FIG. 5b. It is to be noted, however, that FIG. 8 is not a realistic picture. The flank faces 52a and 52b are in truth invisible, because also FIG. 8 is a view in accordance to arrows V—V of FIG. 3a. In truth, the inclination of the flank faces 52a is such as shown in FIG. 4 and FIG. 5c. Only with such an inclination, the projection 52 of the chain 14 is moved as shown in FIGS. 4 and 5c towards the neighbouring sprocket 12b in the direction P, i.e. against the direction $A_x$, when the chain 14 moves in the normal drive direction 24. The larger diameter sprocket 12b in this situation functions as an abutment face. This abutment face 12b positions the chain 14 in axial direction such that there is a maximum degree of overlapping between the flank faces 52a and 28a.

One can further see from FIG. 9 that the rivet heads of the pivot bolts 40 do not project beyond the link member portions 34a, insofar the chain of FIGS. 8 and 9 corresponds to the design as shown in FIG. 3e.

The chain of FIG. 10 corresponds substantially to the design of FIG. 7. Similar parts are designated with the same reference numerals as in FIG. 7, increased, however, again by 100. The roller members have been avoided again so that the chain 214 has a very small axial width in the direction of the axis X—X. This chain can only be used, when—as shown in FIG. 6—also the sprockets of the sprocket unit 116 are designed in accordance with one of the embodiments according to the FIGS. 3a to 3e and according to FIGS. 5a, 5b and 5c.

The chain driving mechanism so far described fulfills the requirements of modern chain driving mechanisms, namely a great difference between the smallest and the largest transmission ratio and small changes of transmission ratio between subsequent transmission ratios.

It is to be noted with respect to FIG. 5c that the abutment face determining the axial position of the projection 52 of the chain 14 can also be provided by a spacer disc or by a terminal disc as shown in FIG. 6 at 121 and 123.

The inclination of the flank faces 28a and 52a represent a dove-tail design. The inclinations can be very small. Due to these inclinations, a disengagement of the chain 14 in the axial direction $A_x$ is prevented also in case of shocks.

Referring to FIG. 4 it is to be noted that the circumferential distance between the flank faces 28a,28b is somewhat larger than the distance between the flank faces 52a,52b such that a certain play of the projection 52 exists with respect to the pocket 28, which facilitates intended disengagement.

The chain of FIG. 4 can be used particularly in such cases in which an existing bicycle is provided with a new wheel-side sprocket unit without further modifications and particularly without exchange of the pedal crank-side sprocket wheel unit.

For the construction of new bicycles, it is preferred to provide both the sprockets of the rear wheel and the sprocket wheels of the pedal crank shaft with engagement means as shown in FIGS. 3a, 3e and FIGS. 5a to 5c and to use a chain in accordance with FIG. 7. This chain has the high advantage that it is very flexible with respect to flection about a flection axis F as shown in FIG. 7. In case of using a sprocket unit on the pedal crank shaft, one has the additional advantage that also in this area, the movement of the chain between sprockets of different diameter is facilitated.

While the sleeve members 146 as shown in FIG. 7 are not absolutely necessary, as one can see from FIG. 10, it is to be noted that these sleeve members 146 of FIG. 7 and 46 of FIG. 4 are very helpful also in view of maintaining lubricant within the chain.

Moreover, it is to be noted that in the embodiment of FIGS. 4 and 7, the difference in diameter of the bores 44,46 on the one hand, and the bores 48,50 on the other hand, allows to recognize the orientation of the link members so as to facilitate automatic assembling. The axial width of the roller members 53 corresponds substantially to the axial distance of the link members 34 and 36 minus a certain axial play.

The additional mover element 22 besides the chain transferring unit 20 helps to maintain the chain 14 in engagement with a selected sprocket even in rough operation. The chain mover 22 may be synchronized with the chain transferring unit 20.

It is needless to say that a further chain mover unit will be provided near the sprocket unit 16, when this sprocket unit 16 comprises a plurality of sprocket wheels. Such chain movers for the chain cooperating with the pedal crank shaft are well known in the art. The sprocket unit 16 normally comprises two or three sprocket wheels, whereas the sprocket unit 10 comprises a larger number of sprockets, e.g. 5 to 10 sprockets. The tension of the chain is maintained by the chain transferring unit 20 in conventional way.

The chain transferring unit as shown in FIG. 1 can be provided with conventional idling rollers engageable with a roller chain as long as a chain type as shown in FIG. 4 is used. In case of a chain as shown in FIG. 7, it is necessary to adapt the idling rollers of the chain transferring unit 20 to the chain 114. This is easily possible.

One can e.g. provide the idling rollers of the chain transferring unit 20 with engagement means corresponding to the pockets 28 of FIGS. 5a and 5b.

It is to be noted that with both the sprocket unit 10 and the sprocket unit 16 of FIG. 1, the maximum diameter sprockets are close to a middle plane of the bicycle, whereas the minimum diameter sprockets are more remote from said middle plane of the bicycle.

Sleeves 46 and 146 of FIGS. 4 and 7 are helpful in the chain riveting operating. Moreover, the sleeves 146 provide a reservoir for lubricant.

The cranked shape of the projections integral with the link member portions 34a as shown in FIG. 3b can also be replaced by a bending operation similar to teeth setting with saws.

The shape of the projections as shown in FIG. 3a and 3b is preferred, because the contact faces between the projections 52 and the neighbouring larger diameter sprocket are so that the specific pressure is relatively small and the wear in this area is also small.

The width of the spacer discs 121 of FIG. 6 are selected such as to prevent a contact of the chain with the maximum diameter sprocket wheel, when the chain is simultaneously in engagement with the neighbouring sprocket wheel of smaller diameter and with a maximum diameter sprocket of the sprocket unit 10.

While a chain mover unit for transporting the chain 14 between subsequent sprocket wheels of the sprocket unit 16 is preferably located there, where the chain in normal driving operation enters into the sprocket unit 16, it is possible to provide chain mover units adjacent the sprocket unit 16 both at the entrance of the chain 14 into the sprocket unit 16 and also at the exit of the chain from the sprocket unit 16 in an analogous way to the assistance of the chain transferring unit 20 by the chain mover unit 22. Thus, the chain can be securely maintained in engagement with the respective sprocket of the sprocket unit 10 and in engagement with the respective selected sprocket wheel of the sprocket wheel unit 16. Referring once more to FIG. 2 the chain 14 is prevented from axial movement beyond the maximum diameter sprocket 12z in a direction opposite to the direction $A_x$ by the terminal disc 17 having a larger diameter than the maximum diameter sprocket 12z. This terminal disc 17 provides an abutment for the chain which is urged against the terminal disc 17 by the cooperation of the engaged pair of flank faces 28a,52a, 28b,52b.

A most important feature of this invention is that subsequent sprockets of at least one sprocket unit can be in direct axial contact without spacer discs therebetween, this being true for at least part of the sprockets. Preferably, all sprockets are in mutual contact without spacer discs therebetween, irrespective of the diameter difference between subsequent sprockets.

It is to be noted that the additional mover unit 22 has first of all a guiding function for maintaining the chain 14 in engagement with the respective selected sprocket. It is synchronized in axial direction with the axial motion of the chain transferring unit 20 for being adapted in its respective position to the selected sprocket. The same is true, if two chain mover units are allocated to the sprocket unit 16.

Figure 12:
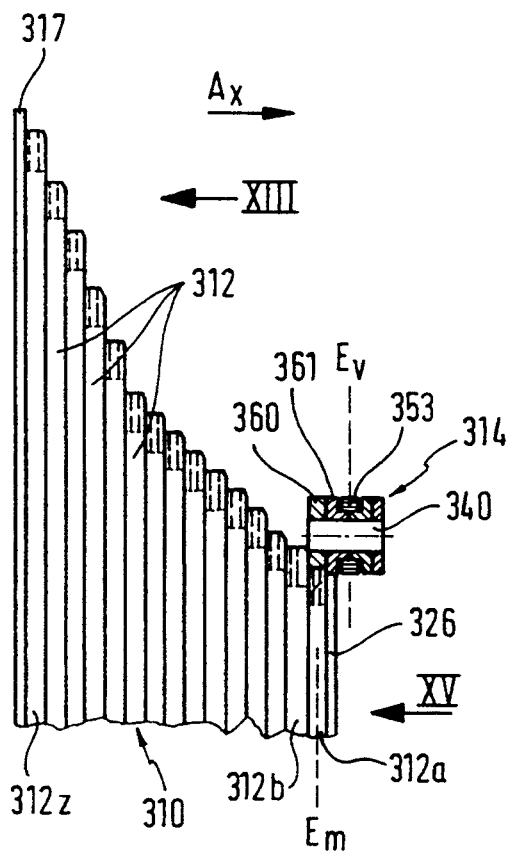
FIG. 12 shows a further modified sprocket unit.

In FIGS. 12 to 16, there is shown a further embodiment. In FIG. 12 one can see again a sprocket unit 310 with a plurality of sprockets 312 arranged in similar way as in FIG. 2. A terminal disc 317 is provided at the free side of the maximum diameter sprocket 312z, and a further terminal disc 326 is provided at the free side of the minimum diameter sprocket 312a. A further small diameter sprocket which is immediately neighboured to the minimum diameter sprocket 312a is designated by 312b. In FIG. 12, a chain 314 plane $E_y$ which is axially spaced by an axial distance $E_m$-$E_y$ is in driving engagement with the sprocket 312a. One can recognize from FIG. 12 that—as in the embodiment of FIGS. 1 to 3a and 4—the chain 314 has a virtual middle from the middle plane $E_m$ of the sprocket 312a in the axial direction $A_x$. The chain is again a roller chain having roller members for engagement with conventional sprockets the teeth of which engage between circumferentially subsequent rollers 353.

The chain comprises engagement link members 360 and interconnecting link members 361. The engagement link members 360 and the interconnecting link members 361 are pivotally interconnected by pivot bolts 340. One can see from FIG. 12 that the engagement link members 360 of the chain 314 engaged with the sprocket 312a are closest to the neighbouring sprocket 312b of larger diameter. Pockets 328 are provided at the radially outer edge of the sprocket 312a. A pair of subsequent pockets 328 is shaped for engagement with projections 352 which are provided at the end portions 360a,360b of the engagement link members 360. The projections 352 are integral with the engagement link member 360. The projections 352 are provided with stepped undercuts 363, which are obtained by coining, stamping or machining. The projections 352 are shaped for engagement into the pockets 328 of the sprocket 312a. These pockets 328 are also provided with undercuts 364 so that when the projections 352 engage into the pockets 328, the undercuts 363 engage behind the undercuts 364. The projections 352 are provided with flank faces 352a, which are intended for engagement with flank faces 328a of the pockets 328 so that in the normal driving operation with the chain moving in the direction 324 of FIG. 15, a torque is transmitted from the chain 314 to the sprocket 312a by the flank faces 352a engaging the flank faces 328a. One can further see from FIG. 14 that the flank faces 328a are adjacent to wedge faces 365. Corresponding wedge faces may be provided at the undercuts 363. By these cooperating wedge faces one may obtain a similar result as at the inclined faces 28a and 52a as shown in FIG. 5c, namely the effect that in normal operation according to a chain movement along the arrow 324 of FIG. 15, the chain is approached to the sprocket 312b by the cooperating wedge from the sprocket 312a in the direction $A_x$ of FIG. 12. One faces. Even in absence of such wedge faces, the cooperating undercuts 363 and 364 prevent a disengagement of the chain 314 from the sprocket 312a in the direction $A_x$ of FIG. 12. One can say that the pockets 328 are partially closed by the undercuts 364 in the direction $A_x$ so as to prevent unintended movement of the engagement link members 360 in the direction $A_x$. As an additional securing member against loss of engagement between the sprocket 312a and the chain 314 by movement of the chain in the direction $A_x$, the terminal disc 326 may be provided. The construction of the chain driving mechanism may correspond to the construction as shown in FIG. 1, particularly with respect to the pedal crank-side sprocket unit 16 and the chain mover means 20 and 22.

As the chain 314 is provided with the roller members 353, this chain may again be engaged also with conventional types of sprockets and sprocket wheels, both on the rear wheel and on the pedal crank shaft. The degree of undercut at 363 and 364 may be selected such that on the one hand, security against unintended axial movement of the chain 314 in the direction $A_x$ is warranted and, on the other hand, an easy disengagement of the projections 352 from the pockets 328 is possible, when the chain is to be transferred to another selected sprocket.

Figure 15:
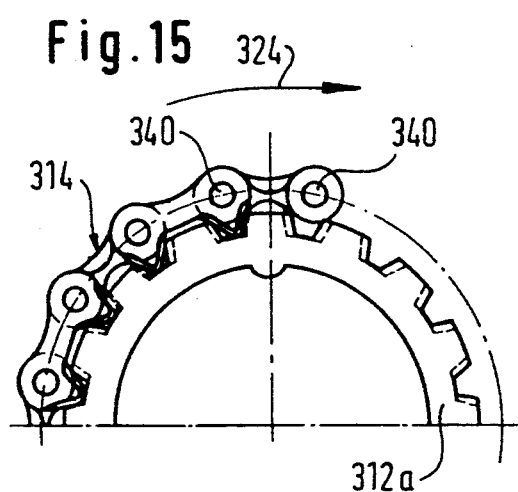
FIG. 15 shows a side view of a sprocket of the sprocket unit of FIG. 12 in engagement with a chain.

The inclination of the flank faces 352a and of the flank faces 328a are such that in driving engagement with the chain moving in the direction of arrow 324 of FIG. 15, the flank faces 352a and 328a are in substantially full face contact, such as to reduce the specific contact pressure and to reduce wear. It is easily understandable that in addition to the cooperating flank faces 328a and 352a, flank faces 352'a and 328'a may participate in torque transmission from the chain 314 to the sprocket 312a or may alone be responsible for torque transmission.

Figure 14:
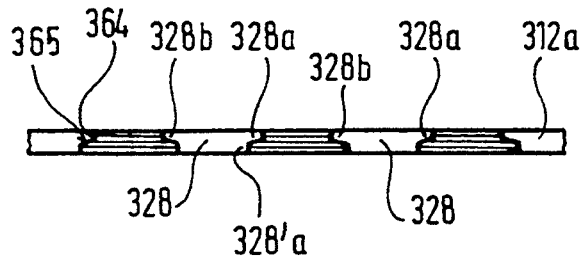
FIG. 14 shows the radially outer circumferential edge of the sprocket of FIG. 13 as seen in the direction XIV of FIG. 13.
Figure 16:
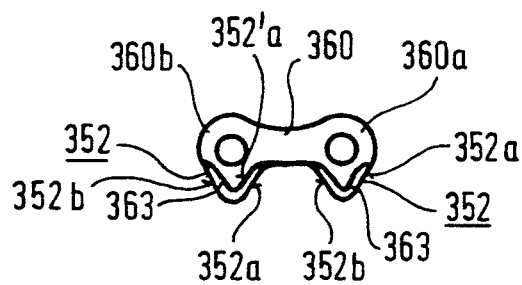
FIG. 16 and 17 show link members of the chain according to FIG. 15.
Figure 17:
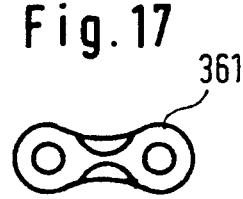

One can further see from FIGS. 14 and 16 that the engagement link members 360 are also provided with flank faces 352b, which are engageable with flank faces 328b in rearwards drive operation. Analogous undercuts are allocated to this flank faces 352b and 328b as shown in FIG. 14 and 16. Also in rearwards drive operation the flank faces 352b are substantially in full face contact with the flank faces 328b.

Figure 13:
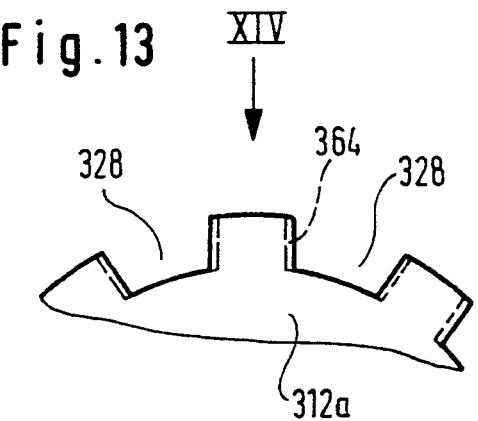
FIG. 13 shows a partial view of a sprocket of the sprocket unit of FIG. 12 as regarded in the direction of arrow XIII of FIG. 12.

The terminal disc 317 prevents a movement of the chain 314 in a direction opposite to the axial direction $A_x$ beyond the sprocket 312z. When the chain 314 is engaged with one of the other sprockets 312, axial movement against the direction $A_x$ of FIG. 12 may be prevented by engagement of the projections 352 with the respective neighbouring sprocket of larger diameter. The projections 352 may again have a certain circumferential play with respect to the pockets 328. The distance of the projections 352 in circumferential direction and the distance of the pockets 328a in circumferential direction are preferably selected such that both projections 352 of one engagement link member 360 can simultaneously be in torque transmission with the respective flank faces of the pockets 328. The rollers 353 may be avoided, if the chain is exclusively intended for engagement with sprockets of the type as shown in FIG. 13, both at the rear wheel side and at the pedal crank side of the respective bicycle.

If rollers are to be avoided, the chain 314 of FIGS. 12 to 16 may be replaced by a chain 414 as shown in FIGS. 30 and 31. It is to be noted that with such chain 414, subsequent projections 452 are integral with subsequent cranked link members 434 similar to the link members 134 as shown in FIG. 7. Analogous parts are designated with the same reference numerals as in FIG. 7 increased, however, by 300. On recognizes that the projections 452 are again integral with the first portions 434a of the cranked link members 434, which are closer to the neighbouring sprocket having an increased diameter. The chain of FIGS. 30 and 31 has a most simple design and a high degree of flexibility about a flexing axis F as shown in FIG. 31. The shape of the projections 452 is identical with the shape of the projections 352 in FIG. 16. Due to the high flexibility of the chain, the movability of the chain by chain transferring means between different sprockets is facilitated.

A further embodiment is shown in FIGS. 18 and 19. The sprocket unit 410 substantially corresponds to the sprocket unit 310 of FIG. 12. The chain 414 as shown in FIGS. 18 and 19 is again a chain with rollers 453 adapted to be engaged with conventional sprockets or sprocket wheels of bicycles having teeth engaging between subsequent rollers 453. The chain 414 comprises first link members 468 and second link members 469 interconnecting two subsequent first link members 468 through pivot bolts 440. The first link members 468 are provided with projections 452 engaging into rectangular pockets 428 of the sprocket 412m. The first link members 468 are substantially coplanar with their respective projections 452, as can be seen from FIG. 18. The link members 468 are substantially in full face contact with the neighbouring sprocket of larger diameter which is designated by 412n in FIG. 18. The second link members 469 are also provided with projections 452′ which are rectangular as the projections 452 are and which are engageable with pockets 428 of rectangular shape.

The second link members 469 are, as one can see from FIG. 18, axially spaced from the sprocket 412m. In order to, nevertheless, provide engagement of the projections 452′ into the respective pockets 428, the projections 452′ are cranked at 455 against the axial direction $A_x$, as indicated in FIG. 18. Such, also the projections 452′ are substantially coplanar with the projections 452 and are axially adjacent the neighbouring sprocket 412n of larger diameter.

In forward driving operation, the flank faces 452a and 452′a transfer the torque to be transmitted in full face contact to the flank faces 428a of the pockets 428. In rearward drive operation opposite to the arrow 424 of FIG. 19, flank faces 452b transfer the torque to the flank faces 428b of the pockets 428.

For securing the projections 452,452′ in engagement with the sprocket 412m against unintended movement in the axial direction $A_x$, the projections 452 and/or 452′ are provided with inclined tip faces 470 which engage behind inclined bottom faces 471 allocated to the pockets 428.

In response to the chain tension in forward driving operation, the projections 452,452′ are urged in radially inwards direction Q as seen FIG. 19a. So, the inclined tip face 470 engages behind the equally inclined bottom face 471. On can again talk of an undercut relationship of the inclined tip and bottom faces 470,471, respectively. Such, the projections 452,452′ are urged in a direction opposite to the axial direction $A_x$ into contact with the abutment provided by the neighbouring sprocket 412n. Such, an unintended axial displacement of the projections 452 and 452′ with respect to the sprocket 412m in the direction $A_x$ is prevented. The same is true also for rearward drive operation, because also in rearward drive operation, a certain radially inwards directed force occurs, which urges the projections 452,452′ with their tip faces 470 radially inwards and behind the bottom faces 471 of the pockets 428.

While in FIG. 18 a chain 414 with roller members 453 has been shown, it is easily understandable that the roller members 453 can be avoided again, if it is not intended to engage the chain 414 with a conventional sprocket having teeth engaging between subsequent rollers 453. In the case of avoiding the rollers 453, it is easily understandable that one can reduce the chain design to the first and second link members 468 and 469 and to pivot bolts interconnecting these first and second link members.

A still further embodiment is shown in FIG. 20. In this embodiment, a conventional chain 514 is shown for engagement with sprockets of a sprocket unit 510 as shown in FIG. 20. The chain 514 is in engagement with the sprocket 512m. The sprocket 512m is provided with pockets 528 which are of half-conical shape. The pivot bolts 540 are provided adjacent their ends with conical studs 575 which are engageable with the half-conical pockets 528. As a result of longitudinal tension within the chain 514 in forward driving condition, the studs 575 are urged in radial inwards direction Q into the pockets 528. The studs 575 are engaged by the inclined face 570 behind the equally inclined flank face 571 of the pocket 528. Such, the stud 575 is against the direction $A_x$ of FIG. 20 approached again against the neighbouring sprocket 512n. The axial movement of the chain 514 opposite to the axial direction $A_x$ is limited either by engagement of a link member 576 with the sprocket 512m or by engagement of the stud end face 577 with the neighbouring sprocket 512n of increased diameter. By the undercut action of the engagement zones 570 and 571 of the conical stud 575 and the semiconical pocket 571 the chain 514 is urged in the direction opposite to the direction $A_x$ towards the sprocket 512n. Such, the unintended disengagement of the chain 514 from the sprocket 512m is prohibited at least in driving operation which may be forward or rearward.

The chain 514 is again composed by a plurality of link members. It comprises roller members 553. The chain may also be restricted to a design composed of only subsequent link members as shown in FIGS. 28 and 29, if an engagement with conventional sprocket or sprocket wheels is not intended. It should, however, be observed that the chain 514 should have a certain resistance against torsion about a torsional axis T as indicated in FIG. 21 for obtaining sufficient engagement force in axial direction opposite to the arrow $A_x$ in FIG. 20.

Figure 23:
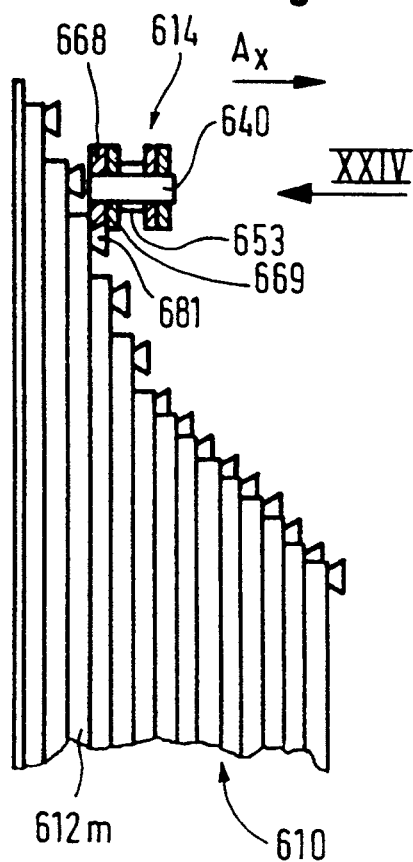
FIG. 23 shows a still further embodiment of a sprocket unit with a chain engaged therein.
Figure 24:
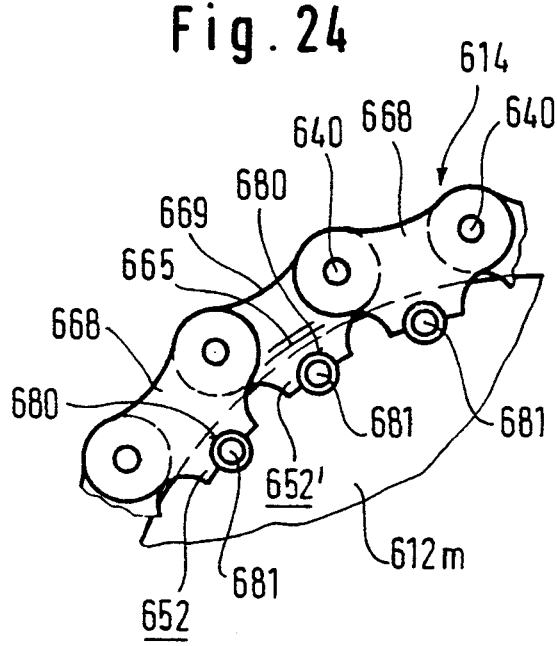
FIG. 24 shows a side view of the embodiment of FIG. 23 in the direction of arrow XXIV of FIG. 23 with only one sprocket being shown.

In the embodiment of FIGS. 23 and 24, there is shown a sprocket unit 610 with a sprocket 612 in engagement with a chain 614. This chain consists of first link members 668 and second link members 669. The first link members 668 are provided with integral projections 652 which are coplanar with the link members 668 and are, as can be seen from FIG. 23, both closest to the sprocket 612m. The second link members 669 are spaced from the sprocket member 612m by the axial thickness of the link members 668. The link members 669 are also provided with projections 652′ which are cranked at 665 so that the projections 652′ are coplanar with the projections 652 and are also adjacent to the sprocket 612m. Both the projections 652 and 652′ are provided with half-circular, semi-conical indentations 680, which can be engaged with pins 681 provided on the sprocket 612m and extending therefrom in the axial direction $A_x$. The pins 681 may be integral with the sprocket 612m or fastened thereto in conventional way. The pins 681 may be half-conical with a substantially plane face directed in radial inward direction, because the radially inner part of the conical shape is not necessary. By the engagement of the half-conical indentation 680 with the pins 681 both the link members 668 and 669 are again urged in a direction opposite to the axial direction $A_x$ towards the sprocket 612m. The radially inward directed force which urges the indentation 680 against the pins 681 results again from the longitudinal tension within the chain 614 both in forward drive direction and in rearward drive direction.

While the chain 614 is again provided with roller members 653, one can easily understand that the chain 614 can be reduced to three components, namely the link members 668,669 and the pivot bolts 640.

Moreover, instead of the chain 614, there can be used a chain 714 as shown in FIGS. 28 and 29. The chain 714 comprises a plurality of cranked link members 734 with first portions to be located closer to the respective sprocket 612m. These first portions 734a are provided with the half-conical indentations 780 for engagement with the conical or half-conical pins 681 of FIG. 23.

The half-conical indentations 780 are again radially urged upon the pins 681 in radially inwards direction in response to a longitudinal tension within the chain 714 such that the link portions 734a are moved toward axial engagement with the sprocket 612m. The chain of FIGS. 28 and 29 is again of high flexibility with respect to a flection axis F and can, therefore, be easily moved between different sprockets.

Figure 25:
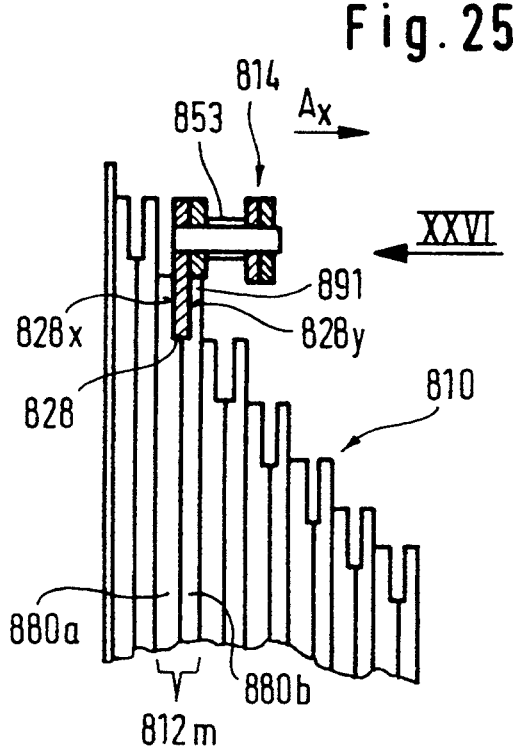
FIG. 25 shows a still further embodiment of a sprocket unit with a chain engaged therein.
Figure 26:
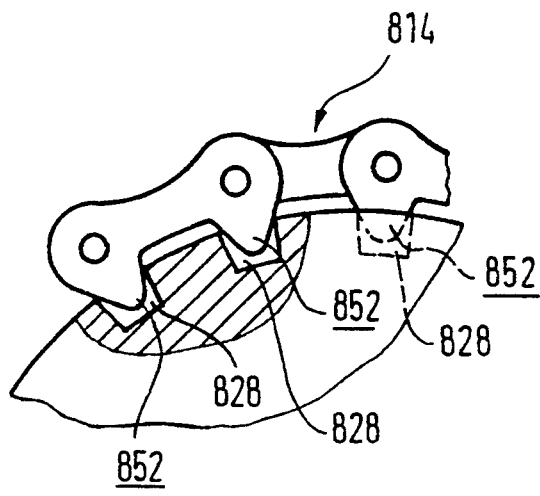
FIG. 26 shows a side view according to arrow XXVI of FIG. 25, partially in section with only one sprocket being shown.

In FIG. 25 and 26, a still further embodiment is shown. A sprocket 812m of a sprocket unit 810 consists of two half sprockets 880a and 880b. Each of these half sprockets 880a, 880b is provided with a plurality of half pockets 828x and 828y. When sandwiching the half sprockets 880a and 880b, registering of pockets 828x and 828y form pockets 828 which may have different shapes, e.g. the profile shape 828 as shown in FIG. 26. These pockets 828 may cooperate with projections 828 of different types of chains, e.g. the chain 814 as shown in FIG. 26 which may again be a roller chain or a non-roller chain. According to FIG. 25, the chain 814 is a roller chain with rollers 853 for engaging a conventional sprocket.

In this embodiment, the axial disengagement of the chain 814 from the sprocket 812m is prevented by a wall 891 of the half pocket 828y. This wall may completely close the pocket 828 or define only a frame for preventing axial disengagement of the chain 814 in the axial direction $A_x$. This may be done again with the aim to prevent on the one hand unintended disengagement of the chain 814 and to facilitate on the other hand intended disengagement of the chain 814 from a predetermined sprocket 812m to a newly selected sprocket.

FIG. 27 shows a very important further development of the invention. It is well possible to provide a sprocket unit 910 with a sprocket unit base member 990 with a plurality sprockets 912. These sprockets 912 may be either directly shaped into the sprocket unit base member 990 or may be provided by sprocket rings of small radial width which are fastened onto the sprocket unit base member 990. In any case, each sprocket 912 may comprise a plurality of pockets 928. This embodiment is not easily to be manufactured taking into consideration that the distribution of the pockets 928 circumferential along the various sprockets is different and the shape of pockets may also be different for different sprockets. Nevertheless, with a large number of sprockets, this embodiment may be preferable in mass production. The shape of pockets may correspond to anyone of the above discussed embodiments. A great advantage of this embodiment is that the relative angular position of the various sprockets is invariable and is always such that optimum engagement conditions occur, when a chain of predetermined design is changed from one sprocket to another one. It is to be noted that the embodiment of FIG. 27 also shows a sprocket unit in the sense of the term "sprocket unit" as used in the claims, though this sprocket unit possibly consists of one integral body.

The undercuts as shown e.g. in the embodiment of FIGS. 12 to 16 at 363 and 364 are again selected such that they provide on the one hand a sufficient security against unintended axial displacement of the chain with respect to respective sprockets in axial direction, and on the other hand allow a relative easy intended disengagement, when the chain is to be moved from a predetermined the pockets are completely closed in the direction $A_x$ of FIG. 12. In this latter case, it is necessary to lift the chain considerably, when the chain is to be moved from one sprocket to a further one. Also with such embodiment, the intended change of the chain between different sprockets is facilitated as compared with a well known system in which the link members are to be lifted beyond the tips of the sprocket teeth and hereupon fall again radially inwards.

In all embodiments, the chain can be extremely thin in axial direction, when the rollers for engagement with conventional sprockets are avoided.

It is to be noted with respect to FIG. 25 that the half sprockets 880a and 880b can be of identical shape.

From FIG. 23 one can see that the conical pin members 681 are only half-conical for the sprockets of smaller diameter. Thus, the conical pins 681 do not interfere with the external diameter of the respective neighbouring sprockets of smaller diameter, even if the diameter difference between subsequent sprockets is very small. A further important advantage of the present invention is that chains can be used which comprise only two immediately adjacent link members of different form or cranked link members of identical shape. In both cases, the chains have an extremely small width in axial direction.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What we claim is:

1. A chain driving mechanism for a bicycle comprising a wheel-side sprocket unit, a pedal crank-side sprocket unit, a chain drivingly connecting the sprocket units, at least one of the sprocket units having a plurality of sprockets arranged serially along an axis and each of the sprockets of said one sprocket unit having a different number of sprocket-side engagement means, the number of sprocket-side engagement means of the sprockets of said one sprocket unit decreasing from sprocket to sprocket in an axial direction from a first terminal sprocket to a second terminal sprocket, and the chain having chain-side engagement means engageable with the sprocket-side engagement means of a respective one of the sprockets of said one sprocket unit, chain transferring means for causing the chain to engage a selected one of the sprockets of said one sprocket unit, each of the sprockets of said one sprocket unit having a respective sprocket middle plane perpendicular to said axis and the chain having a first enveloping side plane and a second enveloping side plane spaced apart from said first enveloping side plane along said axial direction, both of the enveloping side planes being substantially orthogonal to said axis, a virtual chain middle plane substantially orthogonal to said axis being located half-way along said axis between said enveloping side planes, said virtual chain middle plane being axially displaced in said axial direction with respect to a respective sprocket middle plane of a sprocket drivingly engaged by said chain, and the chain-side engagement means including force-transmitting surfaces engageable with the sprocket-side engagement means of the respective sprockets of said one sprocket unit, both extremities of the force-transmitting surfaces in the axial direction being closer to the first enveloping side plane and farther from the second enveloping side plane of the chain.

2. A chain driving mechanism as set forth in claim 1, said virtual chain middle plane being axially displaced with respect to said respective sprocket middle plane by a distance corresponding to at least 15% of the axial distance between said enveloping side planes.

3. A chain driving mechanism as set forth in claim 1, said virtual chain middle plane being axially displaced with respect to said respective sprocket middle plane by a distance corresponding to at least 30% of the axial distance between said enveloping side planes.

4. A chain driving mechanism as set forth in claim 1, said virtual chain middle plane being axially displaced with respect to said respective sprocket middle plane by a distance corresponding to at least 40% of the axial distance between said enveloping side planes.

5. A chain driving mechanism as set forth in claim 1, said sprocket-side engagement means comprising pockets between respective circumferentially subsequent pocket confining portions of the respective sprocket, said pockets being open at a radially outer circumferential edge of the respective sprocket in a radially outward direction, said chain-side engagement means comprising projections, said projections being directed towards an internal loop space surrounded by said chain, said projections being adapted in shape to said pockets for engagement therein, said pockets having two circumferentially spaced, oppositely directed torque transmitting flank faces for torque transmitting engagement with respective flank faces of a respective projection.

6. A chain driving mechanism as set forth in claim 5, said respective sprocket being a sprocket of said wheel-side sprocket unit, one of said circumferentially spaced flank faces of said pocket being intended for torque transmission in a normal forward driving operation, said one flank face being oriented in a generally radial direction and oriented more closely to said radial direction than the other one of said torque transmitting flank faces.

7. A chain driving mechanism as set forth in claim 5, said pockets and said projections having—when regarded in axial direction—a substantially trapezoidal shape.

8. A chain driving mechanism as set forth in claim 5, said projections having a substantially triangular shape with one point of said triangular shape being directed toward said internal loop space.

9. A chain driving mechanism as set forth in claim 5, said projections having a substantially rectangular shape.

10. A chain driving mechanism as set forth in claim 5, said projections being integral with link members, which link members are substantially parallel to said first and second enveloping side planes 11. A chain driving mechanism as set forth in claim 1, said chain comprising a group of substantially identical link members, said link members being—when regarded in a direction parallel to said enveloping side planes and orthogonal with respect to a plane containing subsequent pivot axes of said chain-cranked such that each link member of said group has two circumferentially spaced and axially displaced link portions, a first link portion being closer to said first enveloping side plane and a second link portion being more remote from said first enveloping side plane, a first link portion and a second link portion of two circumferentially subsequent link members being arranged in overlapping relationship and being interconnected by a pivot bolt.

12. A chain driving mechanism as set forth in claim 11, said first link portions being integral with respective projections directed toward an internal loop space, said projections being engageable with respective sprocket-side engagement means of said respective sprocket.

13. A chain driving mechanism as set forth in claim 12, said first link portions integral with said projections being respective leading portions of said link members at a normal forward driving operation.

14. A chain driving mechanism as set forth in claim 11, said chain comprising a group of further link members extending in a circumferential direction between subsequent pivot bolts, further link members comprising outer further link members and inner further link members in alternating arrangement between subsequent pivot bolts, each pivot bolt extending through a pair of cranked link members and a pair of an inner further link member and an outer further link member.

15. A chain driving mechanism as set forth in claim 14, roller members being provided around respective bolts axially between a respective inner further link member and a respective second portion of a cranked link member.

16. A chain driving mechanism as set forth in claim 14, a sleeve member surrounding a respective pivot bolt, said sleeve member being axially shorter than said pivot bolt, said pivot bolt being received by bores of the first portion of a respective cranked link member and of an outer further link member, respectively, a second portion of a respective cranked link member and the respective inner further link member having bores accommodating said sleeve member, said second portion of said respective link member and said inner further link member being rotatable with respect to said sleeve member about a pivot axis.

17. A chain driving mechanism as set forth in claim 5, said chain comprising engagement link members having integral projections for engagement with sprocket-side engagement means adjacent both ends of said engagement link members and interconnecting link members interconnecting respective subsequent engagement link members, said engagement link members being closer to said first terminal side plane than said interconnecting link members.

18. A chain driving mechanism as set forth in claim 5, said chain comprising a group of first link members close to said first terminal side plane and a group of second link members, two subsequent first link members being interconnected by a respective second link member, said second link members overlapping two adjacent respective first link members on the side thereof remote from said first enveloping side plane, said first link members being integral with projections directed toward an internal loop space, said projections of said first link members being provided substantially half way between circumferential end portions of said first link members, said second link members being provided with further projections directed toward said internal loop-space, said further projections being cranked with respect to the respective second link member such that said further projections of said second link members are substantially coplanar with projections of said first link members.

19. A chain driving mechanism as set forth in claim 1, said chain comprising a plurality of pivot bolts with a free engagement section between two axially spaced link members such as to be engageable with chain sprockets having teeth for engagement between subsequent pivot bolts, said pivot bolts being optionally surrounded by roller members.

20. A chain driving mechanism as set forth in claim 1, said sprockets of said at least one sprocket unit having differently shaped sprocket-side engagement means such as to be engageable with said chain, irrespective of the diameter of the respective sprocket.

21. A chain driving mechanism as set forth in claim 1, said chain-side engagement means comprising chain-side engagement studs projecting in a direction opposite to said axial direction beyond respective link members of said chain, said respective link members of the chain being axially adjacent a respective chain engaged sprocket, said engagement studs being engageable with respective pockets at the external circumferential edge of said respective sprocket.

22. A chain driving mechanism as set forth in claim 21, said engagement studs being extensions of respective pivot bolts interconnecting subsequent link members of the chain.

23. A chain driving mechanism as set forth in claim 1, said sprocket-side engagement means comprising pins on the respective sprocket, said pins projecting in said axial direction engagement means comprising recesses for accommodating said pins, said recesses being open towards an internal loop space of said chain.

24. A chain driving mechanism as set forth in claim 23, said recesses being provided in respective edges of link members of said chain, said link members or respective parts thereof being located adjacent a respective sprocket carrying said pins.

25. A chain driving mechanism as set forth in claim 1, securing means being provided for preventing unintended axial disengagement of said sprocket-side engagement means and said chain-side engagement means.

26. A chain driving mechanism as set forth in claim 25, said securing means comprising cooperating undercut means of said sprocket-side engagement means and said chain-side engagement means.

27. A chain driving mechanism as set forth in claim 26, said undercut means being wedge-shaped undercut means.

28. A chain driving mechanism as set forth in claim 26, said undercut means being stepped undercut means.

29. A chain driving mechanism as set forth in claim 26, said undercut means of said chain-side engagement means and said sprocket-side engagement means being such that the chain is urged in response to operational load in a direction opposite to said axial direction toward abutment with an abutment face.

30. A chain driving mechanism as set forth in claim 26, said undercut means being provided by torque transmitting flank faces of said sprocket-side engagement means and said chain-side engagement means.

31. A chain driving mechanism as set forth in claim 30, said undercut means being provided by torque transmitting flank faces of said chain-side engagement means and said sprocket-side engagement means which are responsible for torque transmission at a normal forward driving operation.

32. A chain driving mechanism as set forth in claim 30, said undercut means being provided between torque transmitting flank faces of said sprocket-side engagement means and said chain-side engagement means which are responsible for torque transmission in rearward driving operation.

33. A chain driving mechanism as set forth in claim 26, said undercut means being provided by radially opposite faces of said chain-side engagement means and said sprocket-side engagement means.

34. A chain driving mechanism as set forth in claim 25, said securing means being provided by radially outward open pockets of said sprocket-side engagement means, said pockets being engageable by projections of said chain-side engagement means, said pockets being at least partially closed in said axial direction by closing means.

35. A chain driving mechanism as set forth in claim 34, a respective sprocket comprising two sandwiched half sprockets defining said pockets therebetween.

36. A chain driving mechanism as set forth in claim 35, said half sprockets being of identical shape.

37. A chain driving mechanism as set forth in claim 1, sprocket-side engagement means of at least part of said sprocket being provided on a common sprocket unit base member, said sprocket-side engagement means being either directly shaped in said common sprocket unit base member or in carrier portions carrying said sprocket-side engagement means.

38. A chain driving mechanism as set forth in claim 25, said sprocket-side engagement means comprising pockets which are open both in a radially outward direction and in said axial direction, said pockets being at least partially covered in said axial direction by respective cover means.

39. A chain driving mechanism as set forth in claim 1, said chain-side engagement means comprising pockets opening in a radially outward direction at the external circumferential edge of the respective sprocket, chain-side engagement means comprising integral projections of link members of said chain directed toward an internal loop space, said chain comprising pivot bolts extending in a direction opposite to said axial direction toward a neighbouring sprocket adjacent the respective chain-engaged sprocket and having a larger diameter than that respective chain-engaged sprocket.

40. A chain driving mechanism as set forth in claim 39, said pivot bolts having end portions located radially outside of said neighbouring sprocket.

41. A chain driving mechanism as set forth in claim 39, said pivot bolts having end portions adjacent said neighbouring sprocket, said end portions having end faces substantially coplanar with a side face of the respective link member facing said neighbouring sprocket.

42. A chain driving mechanism as set forth in claim 39, said pivot bolts having end portions extending in a direction opposite to said axial direction beyond respective link members, said link members having an engagement face zone adjacent said neighbouring sprocket and a bolt penetration face zone, said bolt penetration face zone being axially displaced with respect to said engagement face zone in said axial direction, a respective end portion extending beyond the respective bolt penetration face zone but not beyond the respective engagement face zone.

43. A chain driving mechanism as set forth in claim 42, said engagement face zone and said bolt penetration face zone being provided by said link members having increased axial width adjacent an internal loop space.

44. A chain driving mechanism as set forth in claim 42, said engagement face zone and said bolt penetration face zone being provided by a cranked configuration of said link members.

45. A chain driving mechanism as set forth in claim 1, spacer discs being provided between at least a part of pairs of axially subsequent sprockets within a sprocket unit.

46. A chain driving mechanism as set forth in claim 1, said chain transferring means comprising respective chain control units at both locations where the chain enters into the respective sprocket unit and where the chain leaves the respective sprocket unit.

47. A chain driving mechanism as set forth in claim 1, the sprockets of both sprocket units having sprocket-side engagement means adapted for engagement with one single group of chain-side engagement means.

48. A chain driving mechanism as set forth in claim 1, the sprockets of the wheel-side sprocket unit and the pedal crank-side sprocket unit being shaped for engagement into different groups of chain-side engagement means.

49. A chain driving mechanism as set forth in claim 48, the sprockets of the pedal crank-side sprocket unit being provided with sprocket-side engagement means having radially directed teeth, said radially directed teeth being adapted for engagement between engagement sections of subsequent pivot bolts acting as additional chain-side engagement means of the chain, said pivot bolts being optionally surrounded by respective roller members.

50. A chain driving mechanism as claimed in claim 1, wherein at least some of the sprockets of a sprocket unit (12) of said sprocket unit (10) are axially adjacent each other with substantially no spacing between them in the axial direction.

51. A chain driving mechanism as claimed in claim 1, wherein all sprockets of said sprocket unit are axially adjacent each other with substantially no spacing between them in the axial direction.

52. A chain driving mechanism as claimed in claim 1, wherein the chain is asymmetrical with respect to the virtual chain middle plane.

53. A chain driving mechanism for a bicycle comprising a wheel-side sprocket unit, a pedal crank-side sprocket unit, a chain drivingly connecting the sprocket units, at least one of the sprocket units having a plurality of sprockets arranged serially along an axis and each of the sprockets of said one sprocket unit having a different number of sprocket-side engagement means, the number of sprocket-side engagement means of the sprockets of said one sprocket unit decreasing from sprocket to sprocket in an axial direction from a first terminal sprocket to a second terminal sprocket, and the chain having chain-side engagement means engageable with the sprocket-side engagement means of a respective one of the sprockets of said one sprocket unit, chain transferring means for causing the chain to engage a selected one of the sprockets of said one sprocket unit, each of the sprockets of said one sprocket unit having a respective sprocket middle plane perpendicular to said axis and the chain having a first enveloping side plane and a second enveloping side plane spaced apart from said first enveloping side plane along said axial direction, both of the enveloping side planes being substantially orthogonal to said axis, a virtual chain middle plane substantially orthogonal to said axis being located half-way along said axis between said enveloping side planes, said virtual chain middle plane being axially displaced in said axial direction with respect to a respective sprocket middle plane of a sprocket drivingly engaged by said chain, and the sprocket-side engagement means of each sprocket of said one sprocket unit including force-transmitting surfaces engageable by the chain-side engagement means of the chain, the spacing in the axial direction between the force-transmitting surfaces of adjacent sprockets being substantially less than the width in the axial direction between the extremities of said force-transmitting surfaces.

54. A chain driving mechanism as claimed in claim 53, wherein the spacing in the axial direction between the force-transmitting surfaces of adjacent sprockets is less than two thirds of the width in the axial direction between the extremities of said force-transmitting surfaces.

55. A chain driving mechanism as claimed in claims 53, wherein the spacing in the axial direction between the force-transmitting surfaces of adjacent sprockets is less than one half of the width in the axial direction between the extremities of said force-transmitting surfaces.

56. A chain driving mechanism as claimed in claim 53, wherein the spacing in the axial direction between the force-transmitting surfaces of adjacent sprockets is substantially nil.

57. A chain driving mechanism for a bicycle comprising a wheel-side sprocket unit, a pedal crank-side sprocket unit, a chain drivingly connecting the sprocket units, at least one of the sprocket units having a plurality of sprockets arranged serially along an axis and each of the sprockets of said one sprocket unit having a different number of sprocket-side engagement means, the number of sprocket-side engagement means of the sprockets of said one sprocket unit decreasing from sprocket to sprocket in an axial direction from a first terminal sprocket to a second terminal sprocket, and the chain having chain-side engagement means engageable with the sprocket-side engagement means of a respective one of the sprockets of said one sprocket unit, chain transferring means for causing the chain to engage a selected one of the sprockets of said one sprocket unit, said sprocket-side engagement means comprising pockets between respective circumferentially subsequent pocket confining portions of the respective sprocket, said pockets being open at an external circumferential edge of the respective sprocket in a radially outward direction, said chain-side engagement means comprising projections, the projections being adapted in shape to said pockets for engagement therein, said pockets having two circumferentially spaced, oppositely directed torque transmitting flank faces for torque transmitting engagement with respective flank faces of a respective projection, said projection being integral with link members of said chain, which link members are substantially parallel to a plane of a chain loop.

58. A chain driving mechanism for a bicycle comprising a wheel-side sprocket unit, a pedal crank-side sprocket unit, a chain drivingly connecting the sprocket units, at least one of the sprocket units having a plurality of sprockets arranged serially along an axis and each of the sprockets of said one sprocket unit having a different number of sprocket-side engagement means, the number of sprocket-side engagement means of the sprockets of said one sprocket unit decreasing from sprocket to sprocket in an axial direction from a first terminal sprocket to a second terminal sprocket, and the chain having chain-side engagement means engageable with the sprocket-side engagement means of a respective one of the sprockets of said one sprocket unit, chain transferring means for causing the chain to engage a selected one of the sprockets of said one sprocket unit, each of said sprockets having a respective sprocket middle plane perpendicular to said axis, said chain having a first enveloping side plane and a second enveloping side plane spaced from said first enveloping side plane along said axial direction, both said enveloping side planes being substantially orthogonal to said axis, said chain comprising a group of substantially identical link members, said link members being—when regarded in a direction parallel to said enveloping side planes and orthogonal with respect to a plane containing subsequent pivot axes of said chain—cranked such that each link member of said group has two circumferentially spaced and axially displaced link portions, a first link portion being closer to said first enveloping side plane and a second link portion being more remote from said first enveloping side plane, a first link portion and a second link portion of two circumferentially subsequent link members being arranged in overlapping relationship and being interconnected by pivot means.

* * * * *

UNITED STATES PATENT AND TRADEMARK OFFICE
CERTIFICATE OF CORRECTION

PATENT NO. : 5,362,278

DATED : October 25, 1994

INVENTOR(S) : Eduard Bergles et al.

It is certified that error appears in the above-identified patent and that said Letters Patent is hereby corrected as shown below:

<u>Title Page, Item 75, 2nd line</u>, "Schweinfurt;" should read --Schweinfurt, Germany--;

<u>Title Page, Item 75, 3rd and 4th lines</u>, "both of Netherlands" should read --Germany--;

<u>Col. 3, line 30</u>, "pocket" should read --pockets--;

<u>Col. 12, line 10</u>, "pocket" should read --pockets--;

<u>Col. 13, line 27</u>, "face" should read --faces--;

<u>Col. 14, lines 15-17 should not be in italics</u>;

<u>Col. 14, line 65</u>, "be only" should read --have only--;

<u>Col. 14, line 67</u>, "One" should read --One can--;

<u>Col. 16, line 21</u>, "hang" should read --hand,--;

<u>Col. 19, line 5</u>, "chain 314" should read --chain 314 is in driving engagement with the sprocket 312a. One can recognize from Fig. 12 that - as in the embodiment of Figs. 1 to 3a and 4 - the chain 314 has a virtual middle--;

<u>Col. 19, lines 6-9</u>, delete --is in driving engagement with the sprocket 312a. One can recognize from Fig. 12 that - as in the embodiment of Figs. 1 to 3a and 4 - the chain 314 has a virtual middle";

<u>Col. 19, lines 49-50</u>, delete "from the sprocket 312a in the direction $A_x$ of FIG. 12. One";

<u>Col. 20, line 53</u>, "On" should read --One--;

<u>Col. 21, line 42</u>, "On" should read --One--;

<u>Col. 23, line 24</u>, "projections 828 should read --projections 852--;

<u>Col. 23, line 43</u>, "plurality" should read --plurality of--;

UNITED STATES PATENT AND TRADEMARK OFFICE
CERTIFICATE OF CORRECTION

PATENT NO. : 5,362,278

DATED : October 25, 1994

INVENTOR(S) : Eduard Bergles et al.

It is certified that error appears in the above-identified patent and that said Letters Patent is hereby corrected as shown below:

Col. 24, lines 4-5, "predetermined" should read --predetermined sprocket to a further selected sprocket. This is true for all embodiments. It is, however, also possible that--;

Col. 25, line 66, "chain-cranked" should read --chain -- cranked";

Col. 26, line 67, "member" should read --members--;

Col. 29, lines 35-36, delete "of a sprocket unit (12)--;

Col. 30, bridging lines 20-21, "claims 53" should read --claim 53--.

Signed and Sealed this

Eleventh Day of April, 1995

Attest:

BRUCE LEHMAN

Attesting Officer

Commissioner of Patents and Trademarks